(12) United States Patent
Kim et al.

(10) Patent No.: US 10,483,626 B2
(45) Date of Patent: Nov. 19, 2019

(54) ELECTRONIC DEVICE USING METAL COVER AS ANTENNA RADIATOR

(71) Applicant: Samsung Electronics Co., Ltd., Suwon-si, Gyeonggi-do (KR)

(72) Inventors: Jaehyung Kim, Suwon-si (KR); Jinu Kim, Suwon-si (KR); Jesun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/287,054

(22) Filed: Feb. 27, 2019

(65) Prior Publication Data

US 2019/0267699 A1    Aug. 29, 2019

(30) Foreign Application Priority Data

Feb. 27, 2018    (KR) .................. 10-2018-0023938

(51) Int. Cl.
    *H01Q 1/48*     (2006.01)
    *H01Q 1/24*     (2006.01)
    *H04M 1/02*     (2006.01)
    *H01Q 1/44*     (2006.01)
    *G06F 1/16*     (2006.01)

(52) U.S. Cl.
    CPC .............. *H01Q 1/243* (2013.01); *H01Q 1/44* (2013.01); *H01Q 1/48* (2013.01); *H04M 1/0249* (2013.01); *H04M 1/0266* (2013.01); *H04M 1/0277* (2013.01); *G06F 1/1626* (2013.01)

(58) Field of Classification Search
    CPC .................. H05K 9/0007; H05K 13/00; G02F 1/133308; G02F 1/1336; H02J 7/0021; H01R 24/62; H01R 12/716; G02B 6/0088; G02B 6/0051; G02B 6/009

USPC .......... 455/575.7; 355/72; 343/893; 349/12; 345/174

See application file for complete search history.

(56) References Cited

U.S. PATENT DOCUMENTS 7,777,684 B2    8/2010    Rao et al.
8,957,814 B2    2/2015    Eom et al.
(Continued)

FOREIGN PATENT DOCUMENTS

WO    2017/183802 A1    10/2017

OTHER PUBLICATIONS

Eom et al.; Embedded Antenna for Metallic Handheld Communication Devices; Progress in Electromagnetics Research B; vol. 57; pp. 127-138; 2014; Korea.
(Continued)

*Primary Examiner* — Phuoc H Doan
(74) *Attorney, Agent, or Firm* — Jefferson IP Law, LLP

(57) ABSTRACT

An electronic device is provided. The electronic device includes a housing including a front plate and a back plate facing away from the front plate, a display positioned within the housing and exposed through the front plate, and a printed circuit board (PCB) interposed between the front plate and the back plate. The back plate includes a first conductive part having a quadrangular cutting elongated from a corner in the second direction, when viewed from above the back plate, a second conductive part positioned in the cutting, when viewed from above the back plate, and an insulating part of an L shape elongated between the first conductive part and the second conductive part, when viewed from above the back plate, and contacting the first conductive part and the second conductive part.

20 Claims, 22 Drawing Sheets

(56) References Cited

U.S. PATENT DOCUMENTS

| | | |
|---|---|---|
| 9,190,714 B2 | 11/2015 | Eom et al. |
| 10,218,052 B2 | 2/2019 | Pascolini et al. |
| 2008/0231532 A1 | 9/2008 | Rao et al. |
| 2012/0313834 A1 | 12/2012 | Eom et al. |
| 2014/0361669 A1 | 12/2014 | Jarvis et al. |
| 2014/0361935 A1 | 12/2014 | Jarvis et al. |
| 2015/0070219 A1 | 3/2015 | Dinh et al. |
| 2015/0155618 A1 | 6/2015 | Eom et al. |
| 2016/0336643 A1 | 11/2016 | Pascolini et al. |
| 2018/0269561 A1 | 9/2018 | Kim et al. |
| 2018/0277936 A1 | 9/2018 | Dinh et al. |

OTHER PUBLICATIONS

International Search Report with Written Opinion dated Jun. 18, 2019; International Appln. No. PCT/KR2019/002359.

ELECTRONIC DEVICE USING METAL COVER AS ANTENNA RADIATOR

CROSS-REFERENCE TO RELATED APPLICATION

This application is based on and claims priority under 35 U.S.C. § 119(a) to Korean patent application number 10-2018-0023938, filed on Feb. 27, 2018, in the Korean Intellectual Property Office, the disclosure of which is incorporated by reference herein its entirety.

BACKGROUND

1. Field

The disclosure relates to a technology for a radiator of an electronic device including a metal housing.

2. Description of Related Art

A mobile electronic device such as a smartphone, a tablet, or the like, may communicate with a network by using an internal or external antenna. The mobile electronic device may transmit or receive signals in frequency bands ranging from a frequency band (including, for example, 900 MHz, 1.8 GHz, or 2.1 GHz) for 3rd generation (3G) communication to a frequency band for 4th generation (4G) and 5th generation (5G) communication, depending on an electrical path for transmitting or receiving a wireless signal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device. The electronic device includes a housing that includes a front plate and a back plate facing away from the front plate, a display that is positioned within the housing and is exposed through the front plate, and a printed circuit board (PCB) that is interposed between the front plate and the back plate. The back plate may have a quadrangular shape including a first periphery elongated in a first direction, and a second periphery shorter than the first periphery and elongated in a second direction perpendicular to the first direction and may include a first conductive part that has a quadrangular cutting elongated from a corner in the second direction, when viewed from above the back plate, a second conductive part that is positioned in the cutting, when viewed from above the back plate, and an insulating part of an L shape that is elongated between the first conductive part and the second conductive part, when viewed from above the back plate, and contacts the first conductive part and the second conductive part. The PCB may include a first ground plane that is interposed between the first conductive part and the front plate, is elongated in the second direction, and is spaced apart from the second periphery, a second ground plane that is electrically connected with the first ground plane, and at least one radio frequency communication circuit that is electrically connected to a first point on the first ground plane adjacent to the first periphery and a second point on the first conductive part adjacent to the second periphery. The second ground plane may be elongated in the second direction parallel to the second conductive part between the second conductive part and the front plate, and at least a portion of the second ground plane may be elongated and may be separated from an edge of the first ground plane by a slit elongated in the second direction along a portion of the insulating part.

Additional aspects will be set forth in part in the description which follows and, in part, will be apparent from the description, or may be learned by practice of the presented embodiments.

In accordance with another aspect of the disclosure, an electronic device is provided. The electronic device includes a housing that includes a front plate and a back plate facing away from the front plate, a display that is positioned within the housing and is exposed through the front plate, and at least one printed circuit board (PCB) that is interposed between the front plate and the back plate. The back plate may have a quadrangular shape including a first periphery elongated in a first direction, and a second periphery shorter than the first periphery and elongated in a second direction perpendicular to the first direction and may include a first conductive part and a second conductive part separated by a first slit, and an insulating part formed in the first slit and contacting the first conductive part and the second conductive part. The at least one PCB may include a first ground plane that is interposed between the first conductive part and the front plate, a second ground plane that is electrically connected with the first ground plane, and at least one radio frequency communication circuit that is electrically connected to a first point on the first ground plane adjacent to the first periphery, a second point on the second conductive part adjacent to at least one of the first periphery and the second periphery, and a third point on the first conductive part adjacent to the second periphery. The second ground plane may be elongated in the second direction parallel to the second conductive part between the second conductive part and the front plate, and at least a portion of the second ground plane may be elongated and may be separated from an edge of the first ground plane by a second slit.

In accordance with yet another aspect of the disclosure, an electronic device is provided. The electronic device includes a housing including a front plate and a back plate facing away from the front plate, a display positioned within the housing and exposed through the front plate, and at least one printed circuit board (PCB) interposed between the front plate and the back plate. The back plate may have a quadrangular shape including a first periphery elongated in a first direction, and a second periphery shorter than the first periphery and elongated in a second direction perpendicular to the first direction, and may include a first conductive part and a second conductive part separated by a first slit, and an insulating part formed in the first slit and contacting the first conductive part and the second conductive part. The at least one PCB may include a first ground plane that is interposed between the first conductive part and the front plate, a second ground plane that is electrically connected with the first ground plane, and at least one radio frequency communication circuit that is electrically connected to a first point on the first ground plane adjacent to the first periphery, a second point on the second conductive part adjacent to at least one of the first periphery and the second periphery, and a third point on the first conductive part adjacent to the second periphery. The second ground plane may be elongated in the second direction parallel to the second conductive part between the second conductive part and the front plate, and at least a portion of the second ground plane may be elongated and may be separated from an edge of the first ground plane by a second slit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that that various changes and modifications of various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
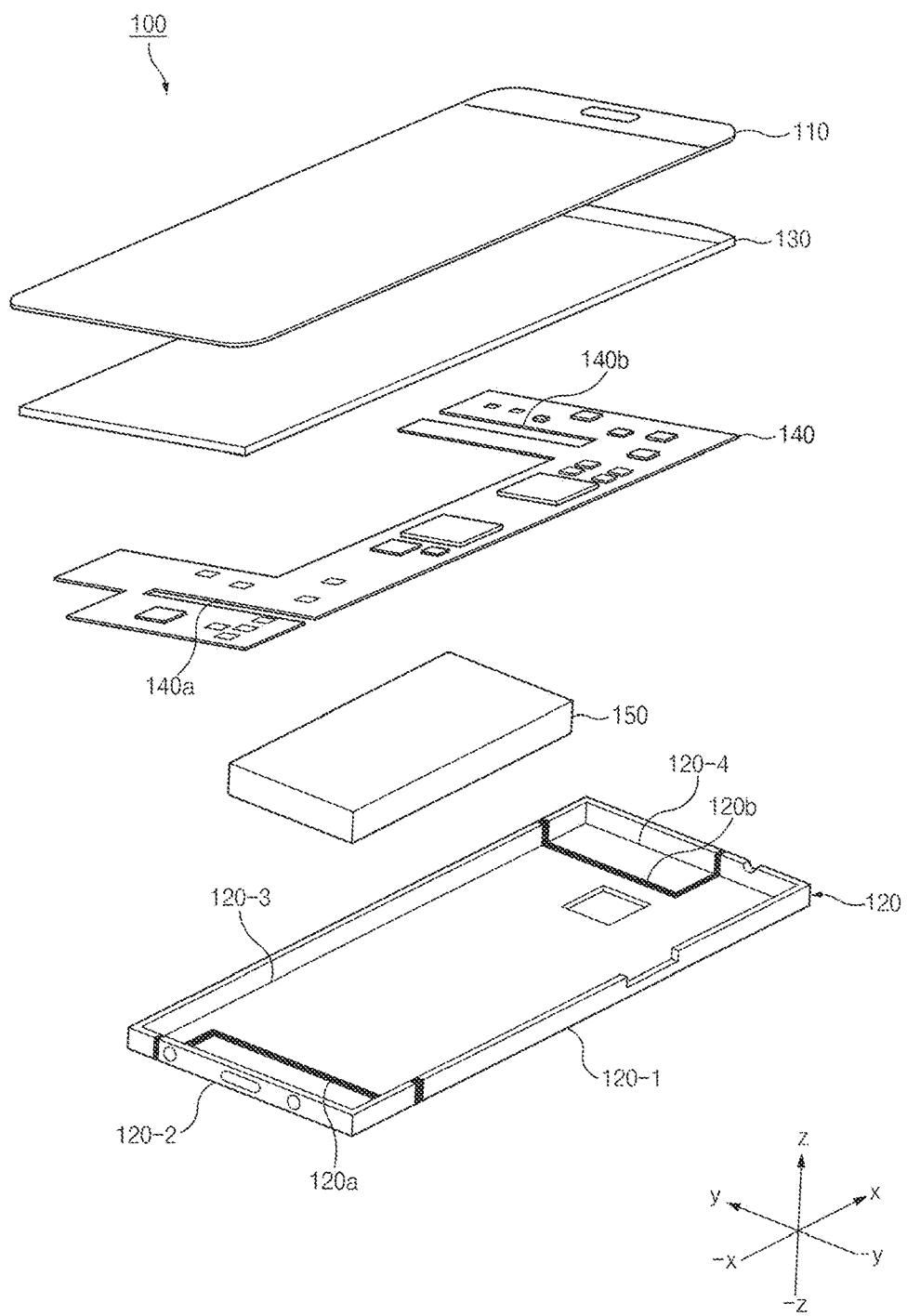
FIG. 1 is an exploded perspective view illustrating components of an electronic device according to various embodiments of the disclosure.

FIG. 1 is an exploded perspective view illustrating a configuration of an electronic device according to various embodiments of the disclosure.

Referring to FIG. 1, an electronic device 100 may include a glass cover 110, a metal cover 120, a display 130, a printed circuit board (PCB) 140, and a battery 150. According to an embodiment, the electronic device 100 may not include some of the components illustrated in FIG. 1 or may further include any other component(s) not illustrated in FIG. 1. In addition, the order in which the components included in the electronic device 100 are stacked or arranged may be different from the order illustrated in FIG. 1.

According to an embodiment, the glass cover 110 and the metal cover 120 may form a housing of the electronic device 100. For example, the housing of the electronic device 100 may include the glass cover 110 and the metal cover 120. According to an embodiment, the housing may form the exterior of the electronic device 100 and may protect parts positioned within the electronic device 100 from external impact.

According to an embodiment, the glass cover 110 may form a front surface (or a positive z-direction exterior) of the electronic device 100. For example, the glass cover 110 may be a front plate of the housing. According to an embodiment, the glass cover 110 may transmit light generated by the display 130. According to an embodiment, the user may touch a portion of his/her body (e.g., a finger) on the glass cover 110 to perform a touch gesture. According to an embodiment, the glass cover 110 may be formed of tempered glass, reinforced plastic, a flexible polymer material, or the like.

According to an embodiment, the metal cover 120 may form a back surface (or a negative z-direction exterior) of the electronic device 100. For example, the metal cover 120 may include a back plate of the housing. According to an embodiment, the back plate may include a first periphery 120-1, a second periphery 120-2, a third periphery 120-3, and a fourth periphery 120-4. For example, the first periphery 120-1 may be elongated in a first direction (e.g., a positive x-direction or a negative x-direction) and may have a first length. The second periphery 120-2 may be elongated in a second direction (e.g., a positive y-direction or a negative y-direction) perpendicular to the first direction and may have a second length shorter than the first length. The third periphery 120-3 may be in parallel with the first periphery 120-1 and may have the first length. The fourth periphery 120-4 may be in parallel with the second periphery 120-2 and may have the second length. For example, the back plate may have a quadrangular shape.

According to an embodiment, the metal cover 120 may form a side surface (or positive x-direction, negative x-direction, positive y-direction, and negative y-direction exteriors) of the electronic device 100. For example, the metal cover 120 may form the side surface of the electronic device 100 by extending from a periphery of the back plate in the positive z-direction by a specified length. According to an embodiment, the side surface may include a first side elongated and formed from the first periphery 120-1, a second side elongated and formed from the second periphery 120-2, a third side elongated and formed from the third periphery 120-3, and a fourth side elongated and formed from the fourth periphery 120-4. For example, the first side and the third side may be elongated and formed in the first direction (e.g., the positive x-direction or the negative x-direction) so as to have the first length. The second side and the fourth side may be elongated and formed in the second direction (e.g., the positive y-direction or the negative y-direction) so as to have the second length.

According to an embodiment, the metal cover 120 may be formed of a conductive material. The conductive material may be, for example, a metal material.

According to an embodiment, a first slit 120a may be formed in the metal cover 120. For example, the first slit 120a may be elongated in the positive y-direction from the first periphery 120-1 of the back plate and may be elongated and formed in the negative x-direction from a specified point. For example, the first slit 120a may be formed in an L shape. Also, similar to the first slit 120a, a second slit 120b may be formed in the metal cover 120. The second slit 120b may be elongated in the negative y-direction and may be elongated and formed in the positive x-direction from a specified point. According to an embodiment, the first slit 120a and the second slit 120b may additionally or alternatively be formed in the sides elongated from the back plate. As such, the metal cover 120 may be partitioned into a plurality of parts by the first slit 120a and the second slit 120b.

According to an embodiment, an insulating part (e.g., first insulating part 125 or second insulating part 129) made of an insulating material may be formed in the first slit 120a and the second slit 120b of the metal cover 120. As such, the plurality of parts of the metal cover 120 that are physically partitioned by the first slit 120a and the second slit 120b may be electrically separated from each other.

According to an embodiment, the display 130 may be interposed between the glass cover 110 and the PCB 140. For example, the display 130 may be positioned within the housing. According to an embodiment, the display 130 may be exposed through the front plate of the housing. For example, the display 130 may be exposed through the glass cover 110. According to an embodiment, the display 130 may display content (e.g., a text, an image, a video image, or a user interface (UI)). The display 130 may be electrically connected with the PCB 140 and may receive data associated with the content. According to an embodiment, the display 130 may further include a touch panel for receiving a touch input (e.g., a user input, a stylus input, etc.).

According to an embodiment, the PCB 140 may be interposed between the metal cover 120 and the display 130. According to an embodiment, the PCB 140 may include a plurality of components for operation of the electronic device 100. The plurality of components may be mounted on the PCB 140, and the plurality of mounted components may be electrically connected to each other through a printed circuit. The plurality of components mounted on the PCB 140 may include one or more of an application processor (AP), a communication processor (CP), a display driver integrated circuit (DDI), or a wireless communication circuit (or a wireless communication module).

According to an embodiment, the PCB 140 may include a plurality of layers necessary to connect and operate the plurality of components. For example, the PCB 140 may include a ground layer (or a ground plane) for forming a ground of the electronic device 100. For example, the ground layer may be formed of a conductive material (e.g., a metal material).

According to an embodiment, a first slit 140a may be formed in the PCB 140. For example, when viewed from above the metal cover 120 (e.g., positive z-direction), the first slit 140a may be formed at a position of the PCB 140, which is similar to at least a portion (e.g., a positive y-direction or negative y-direction slit) of the first slit 120a formed in the metal cover 120. According to an embodiment, a second slit 140b may be formed in the PCB 140. For example, when viewed from above the metal cover 120 (e.g., positive z-direction), the second slit 140b may be formed at a position of the PCB 140, which is similar to at least a portion (e.g., a positive y-direction or negative y-direction slit) of the second slit 120b formed in the metal cover 120.

According to an embodiment, the battery 150 may be interposed between the metal cover 120 and the display 130. According to an embodiment, the battery 150 may supply electrical energy to the display 130 and the PCB 140. For example, the battery 150 may convert chemical energy to electrical energy and may supply the converted electrical energy to the display 130 and the PCB 140. Also, the battery 150 may convert and store electrical energy supplied from a device outside or external to the electronic device 100 to chemical energy. For example, the battery 150 may be a secondary cell that is rechargeable. According to an embodiment, a charging/discharging state of the battery 150 may be managed by a battery management module (or a battery management system (BMS)).

The electronic device 100 may transmit or receive signals in on one or more of a plurality of frequency bands (e.g., a low-band frequency signal and a high-band frequency signal) through L-shaped slits formed in the metal cover 120 and a plurality of slits formed in the PCB 140. In the following drawings, the same reference numerals/marks are used with regard to the same components, and thus, additional description will be omitted to avoid redundancy.

Figure 2:
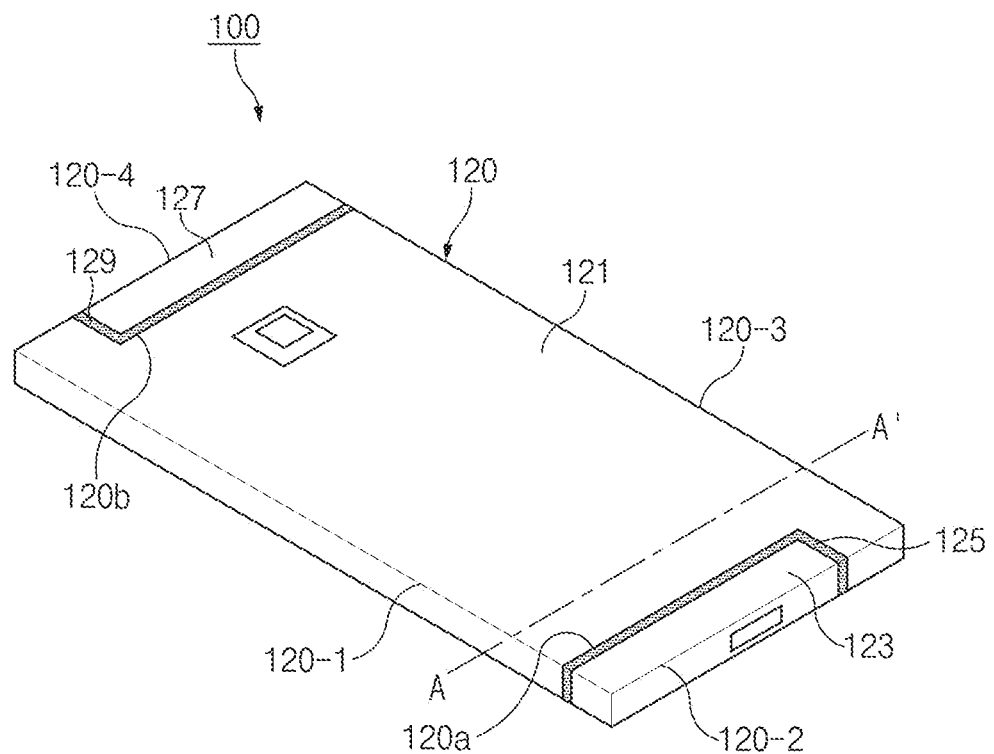
FIG. 2 is a view illustrating a rear perspective of an electronic device according to various embodiments of the disclosure.
Figure 2:
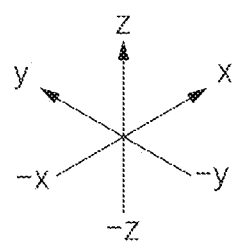

FIG. 2 is a view illustrating a rear perspective of an electronic device according to various embodiments of the disclosure.

Referring to FIG. 2, the L-shaped slits 120a and 120b may be formed in the metal cover 120 (or the back plate) to allow the electronic device 100 to receive signals in one or more of a plurality of frequency bands.

According to an embodiment, the metal cover 120 may include a first conductive part 121, a second conductive part 123, and a first insulating part 125 defined by the L-shaped slits 120a and 120b. The first conductive part 121 and the second conductive part 123 may be formed of a conductive material (e.g., a metal material), and the first insulating part 125 may be formed of an insulating material.

According to an embodiment, the first conductive part 121 and the second conductive part 123 may be physically separated by the first slit 120a formed in the metal cover 120. The first slit 120a may include, for example, a horizontal slit elongated and formed from the first periphery 120-1 in the positive x-direction and a vertical slit elongated and formed from the second periphery 120-2 in the positive y-direction. One end of the horizontal slit may be connected with one end of the vertical slit such that the first slit 120a is formed in an L shape.

According to an embodiment, the first insulating part 125 may be formed between the first conductive part 121 and the second conductive part 123. For example, the first insulating part 125 may be formed in the first slit 120a that is formed in the metal cover 120. As such, as in the first slit 120a, the first insulating part 125 may be formed in an L shape.

According to an embodiment, the metal cover 120 may further include a third conductive part 127 and a second insulating part 129. The second slit 120b for forming the third conductive part 127 may include, for example, a horizontal slit elongated and formed from the third periphery 120-3 in the negative x-direction and a vertical slit elongated and formed from the fourth periphery 120-4 in the negative y-direction. One end of the horizontal slit may be connected with one end of the vertical slit such that the second slit 120b is formed in an L shape. According to an embodiment, the second insulating part 129 may be formed in the second slit 120b. As such, the second slit 120b and the second insulating part 129 may be formed in an L shape.

The electronic device 100 may transmit or receive signals in one or more of a plurality of frequency bands through an L-shaped slit (e.g., the first slit 120a) formed in the metal cover 120. Also, the electronic device 100 may transmit or receive signals in one or more of a plurality of other frequency bands through an L-shaped slit (e.g., the second slit 120b) formed at a different position.

Below, a description will be focused on an operation in which the electronic device 100 receives signals in a plurality of frequency bands through the first conductive part 121, the second conductive part 123, and the first insulating part 125. An operation in which the electronic device 100 receives signals in a plurality of frequency bands through the first conductive part 121, the third conductive part 127, and the second insulating part 129 may be similar to the above operation.

Figure 3:
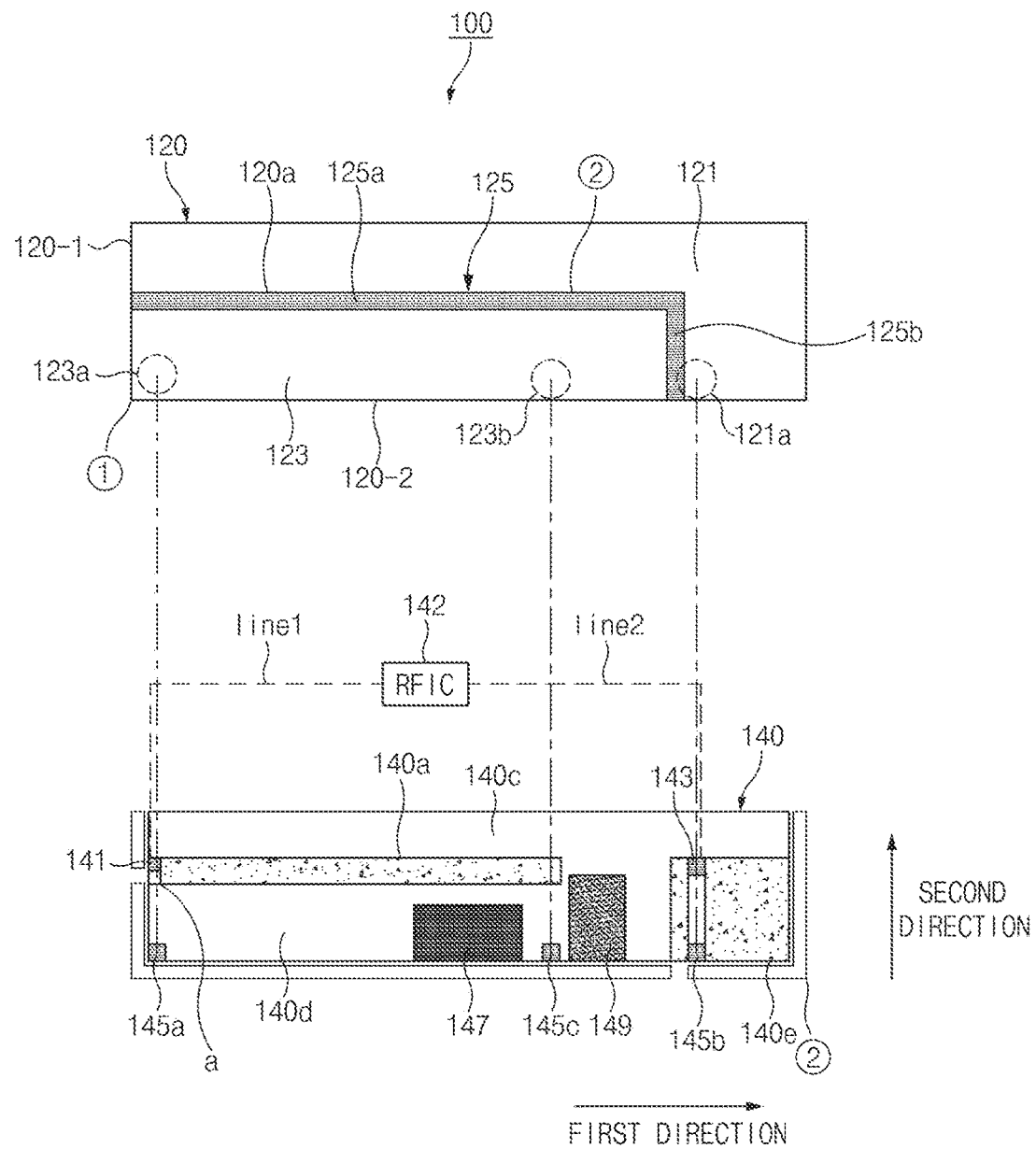
FIG. 3 is a cross-sectional view illustrating an antenna radiator structure including a metal cover and a printed circuit board (PCB) of an electronic device according to an embodiment of the disclosure.

FIG. 3 is a cross-sectional view illustrating an antenna radiator structure including a metal cover and a PCB of an electronic device according to an embodiment of the disclosure.

Referring to FIG. 3, the electronic device 100 may form a feeding point and a ground point at the back plate of the metal cover 120 and the ground plane of the PCB 140. FIG. 3 is a view illustrating a cross section horizontally taken along a line A-A' of FIG. 2.

According to an embodiment, the back plate of the metal cover 120 may include the first conductive part 121, the second conductive part 123, and the first insulating part 125. The first conductive part 121 and the second conductive part 123 may be electrically separated from each other by the first slit 120a. For example, when viewed from above the back plate, a rectangular cutting that is elongated in a first direction from a specified corner ① of the back plate may be formed in the first conductive part 121. The rectangular cutting may be formed, for example, to include the first periphery 120-1 and at least a portion of the second periphery 120-2 from the specified corner ①. The second conductive part 123 may be positioned in the cutting, when viewed from above the back plate.

According to an embodiment, the first insulating part 125 may be elongated between the first conductive part 121 and the second conductive part 123 and may contact the first conductive part 121 and the second conductive part 123. For example, the first insulating part 125 may include a first portion 125a and a second portion 125b elongated and formed in a different direction from the first portion 125a (e.g., in a direction perpendicular to the first portion 125a). The first portion 125a may be in parallel with the first direction, and the second portion 125b may be in parallel with a second direction. According to another embodiment, an insulating part may be formed in a curved shape. For example, the first slit 120a formed in the metal cover 120 may be formed in a curved shape.

According to an embodiment, the first slit 140a that is elongated in the first direction may be formed in the PCB 140. The first slit 140a may form a non-conductive area. According to an embodiment, the PCB 140 may include a first ground plane 140c and a second ground plane 140d electrically connected with the first ground plane 140c. According to an embodiment, the first ground plane 140c and the second ground plane 140d may be elongated in the first direction, and may be at least partially separated by the first slit 140a elongated in the first direction. According to an embodiment, the first ground plane 140c may be positioned between the first conductive part 121 of the metal cover 120 and the front plate (e.g., glass cover 110). According to an embodiment, the second ground plane 140d may be positioned between the second conductive part 123 of the metal cover 120 and the front plate. The second ground plane 140d may be elongated in the first direction parallel to the second conductive part 123 between the second conductive part 123 and the front plate. At least a portion of the second ground plane 140d may be elongated and separated from an edge of the first ground plane 140c by a slit elongated in the first direction along a portion (e.g., the first portion 125a) of the first insulating part 125 of the metal cover 120.

According to an embodiment, the PCB 140 may include at least one feeding part. For example, the PCB 140 may include a first feeding part 141 and a second feeding part 143.

According to an embodiment, the first feeding part 141 and the second feeding part 143 may be connected to a radio frequency integrated circuit (RFIC) 142. For example, the first feeding part 141 and the second feeding part 143 may be connected to the RFIC 142 through a signal line to transmit or receive a radio frequency (RF) signal. The first feeding part 141 may be connected with the RFIC 142 through a first signal line "line 1". The first feeding part 141 may be connected with the RFIC 142 through a second signal line "line 2". Below, in drawings where the PCB 140 is illustrated, the RFIC 142 will be omitted (or will not be illustrated). For example, the RFIC 142 may be implemented on the PCB 140.

According to an embodiment, the first feeding part 141 may be formed at a first point (or a first feeding point) "a" on the second ground plane 140d, which is adjacent to the first periphery 120-1 of the metal cover 120. For example, the RFIC 142 may be electrically connected to the first point "a" through the first feeding part 141. The first feeding part 141 may be electrically connected to the first point "a" of the second ground plane 140d through a conductive line.

According to an embodiment, the first feeding part 141 may be formed at a second point (or a second feeding point) 123a on the second conductive part 123, which is adjacent to at least one of the first periphery 120-1 and the second periphery 120-2 of the metal cover 120. For example, the RFIC 142 may be electrically connected to the second point 123a through the first feeding part 141. According to an embodiment, the first feeding part 141 may be electrically connected with the second point 123a through a first flexible conductive member 145a. For example, the first flexible conductive member 145a may be a C-clip.

According to an embodiment, the second feeding part 143 may be formed at a position corresponding to a third point (or a third feeding point) 121a on the first conductive part 121, which is adjacent to the second periphery 120-2 of the metal cover 120. For example, the RFIC 142 may be electrically connected to the third point 121a through the second feeding part 143. According to an embodiment, the second feeding part 143 may be electrically connected with the third point 121a through a second flexible conductive member 145b. For example, the second flexible conductive member 145b may be a C-clip.

According to an embodiment, the second ground plane 140d of the PCB 140 may be electrically connected to a fourth point (or a ground point) 123b on the second conductive part 123, which is adjacent to the second periphery 120-2 of the metal cover 120. The fourth point 123b may be positioned, for example, between the second point 123a and the third point 121a. According to an embodiment, the second ground plane 140d may be electrically connected with the fourth point 123b through a third flexible conductive member 145c. For example, the third flexible conductive member 145c may be a C-clip.

According to an embodiment, the PCB 140 may further include a cutting part 140e. According to an embodiment, the cutting part 140e may be elongated from a specified corner ② and may be formed in a quadrangular shape. The cutting part 140e may form a non-conductive area of the PCB 140 together with the first slit 140a. As such, the second feeding part 143 may be electrically connected to the third point 121a of the first conductive part 121 through a conductive line.

According to an embodiment, the PCB 140 may include a universal serial bus (USB) terminal 147 for connection with an external device and an earphone jack 149 for connection with an earphone.

Figure 4:
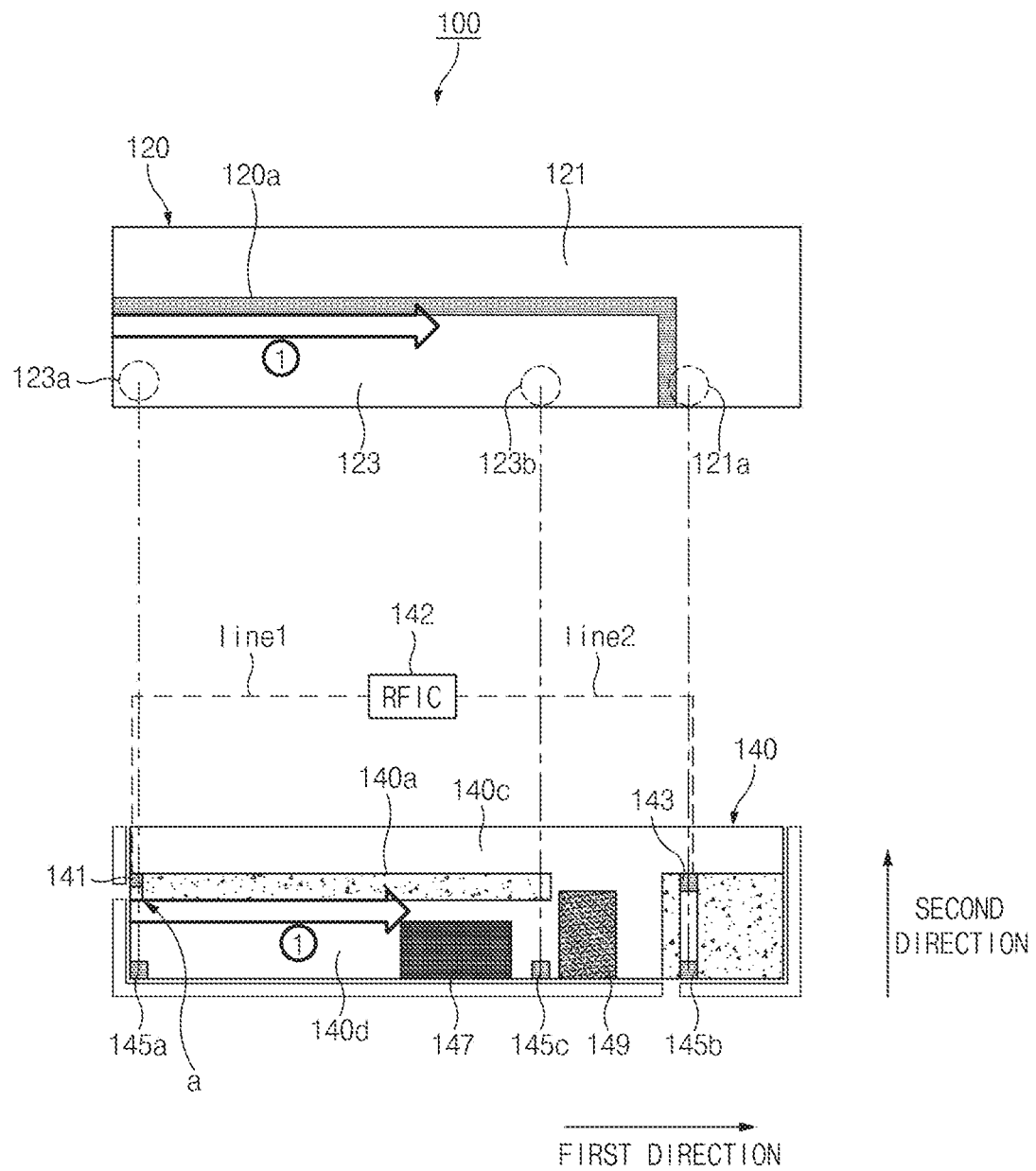
FIG. 4 is a view illustrating a flow of current through which an electronic device according to an embodiment of the disclosure, receives a low-frequency signal.

FIG. 4 is a view illustrating a flow of current through which an electronic device according to an embodiment of the disclosure, receives a low-frequency signal.

Referring to FIG. 4, the electronic device 100 may form flows of current ① and ①' by a current supplied to the first feeding part 141 to transmit or receive a low-band frequency signal. FIG. 4 is a view illustrating a cross section horizontally taken along a line A-A' of FIG. 2.

According to an embodiment, a slot antenna may be implemented such that the second point 123a of the second conductive part 123 is electrically connected with the first feeding part 141 through the first flexible conductive member 145a and the fourth point 123b of the second conductive part 123 is electrically connected with the second ground plane 140d through the third flexible conductive member 145c.

According to an embodiment, a current supplied to the first feeding part 141 may be supplied to the first point "a" of the second ground plane 140d electrically connected thereto. According to an embodiment, the current supplied to the first feeding part 141 may be supplied to the first point "a" to form the flow of current ① at an edge formed by the first slit 140a of the PCB 140. For example, the current supplied through the first feeding part 141 may be supplied to the first point "a" to form the flow of current ① at an edge of at least one of the first ground plane 140c and the second ground plane 140d. The flow of current CD may be formed, for example, in the first direction along the edge.

According to an embodiment, the current transferred through the first feeding part 141 may be supplied to the second point 123a of the second conductive part 123 electrically connected by the first flexible conductive member 145a. According to an embodiment, the current transferred through the first feeding part 141 may be supplied to the second point 123a to form the flow of current ①' at an edge formed by the first slit 120a formed in the metal cover 120. According to an embodiment, the current transferred through the first feeding part 141 may be supplied to the second point 123a to form the flow of current ①' at an edge of at least one of the first conductive part 121 and the second conductive part 123. For example, the flow of current ①' may be formed in the first direction along the edge. The flow of current ①' formed along the edge may be hindered by the second point 123a electrically connected with the second ground plane 140d. At least a portion of the flow of current ①' formed in the first direction along the edge, for example, a flow of current to the second point 123a may be changed.

As such, the electronic device 100 may transmit or receive a signal in a low-band frequency (e.g., 1 GHz) through the flows of current ① and ①' formed in the metal cover 120 and the PCB 140 by the current transferred through the first feeding part 141.

Figure 5:
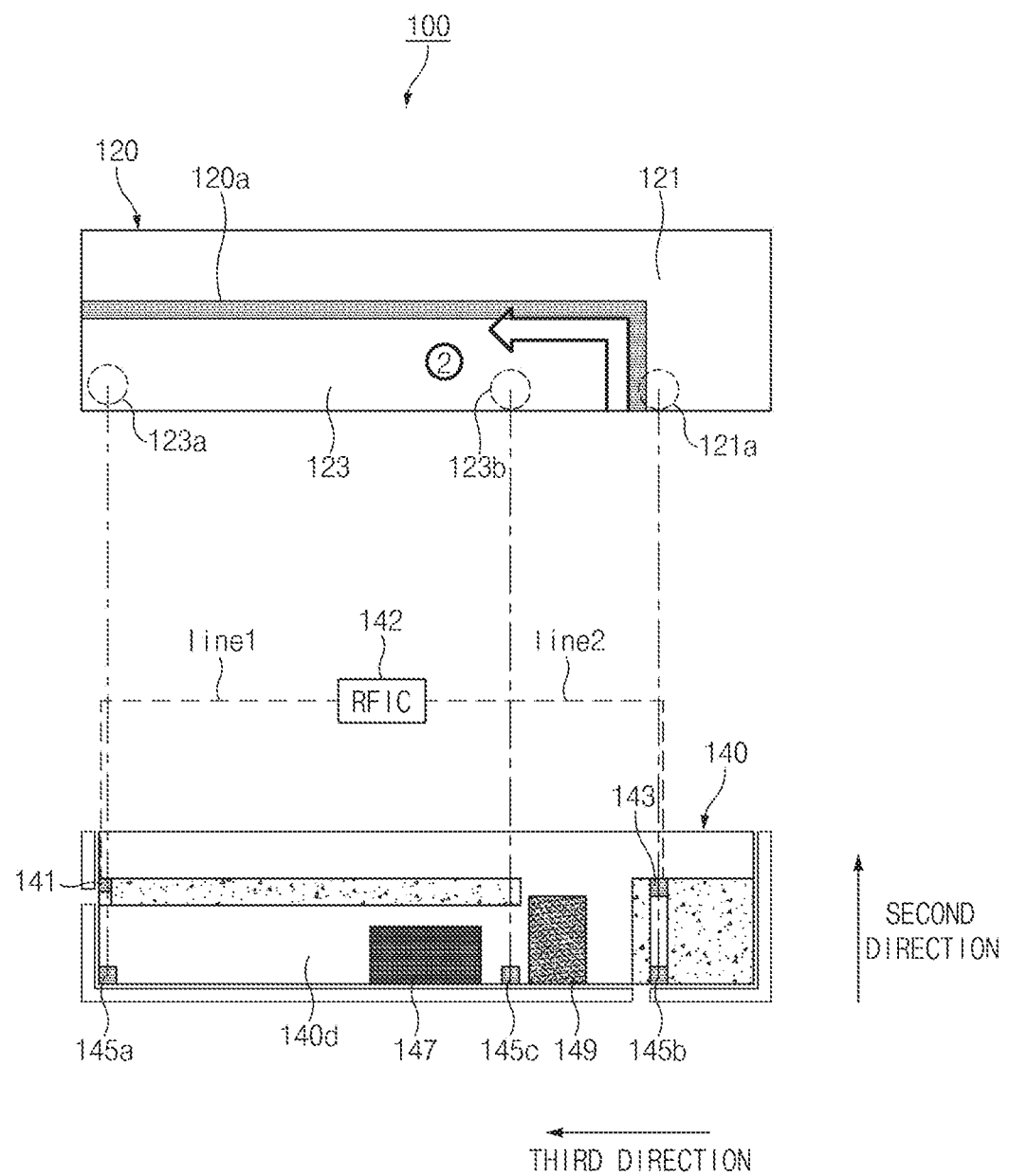
FIG. 5 is a view illustrating a current path through which an electronic device according to an embodiment of the disclosure, receives a high-frequency signal.

FIG. 5 is a view illustrating a current path through which an electronic device according to an embodiment of the disclosure, receives a high-frequency signal.

Referring to FIG. 5, the electronic device 100 may form a flow of current ② by the second feeding part 143 to transmit or receive a signal in a high-band frequency. FIG. 5 is a view illustrating a cross section horizontally taken along a line A-A' of FIG. 2.

According to an embodiment, a slot antenna may be implemented such that the third point 121a of the first conductive part 121 is electrically connected with the second feeding part 143 through the second flexible conductive member 145b and the fourth point 123b of the second conductive part 123 is electrically connected with the second ground plane 140d through the third flexible conductive member 145c.

According to an embodiment, a current transferred through the second feeding part 143 may be supplied to the third point 121a of the first conductive part 121 electrically connected thereto. According to an embodiment, the current transferred through the second feeding part 143 may be supplied to the third point 121a to form the flow of current ② at an edge formed by the first slit 120a formed in the metal cover 120. For example, the current transferred through the second feeding part 143 may be supplied to the third point 121a through the second flexible conductive member 145b, and thus, the flow of current ② may be formed at an edge of at least one of the first conductive part 121 and the second conductive part 123. The flow of current ② may be formed, for example, in the second direction and a third direction along the edge. The third direction may be a direction opposite to the first direction illustrated in FIG. 4.

According to an embodiment, a flow of a current transferred through the second feeding part 143 may not be formed in the PCB 140. As such, an electrical path formed only in the metal cover 120 by the current transferred through the second feeding part 143 may be shorter than an electrical path formed in both the metal cover 120 and the PCB 140 by the current transferred through the first feeding part 141.

As such, the electronic device 100 may transmit or receive a signal in a high-band frequency (e.g., 1.7 to 2.7 GHz) through an electrical path ② formed in the metal cover 120 by the current transferred through the second feeding part 143.

Figure 6A:
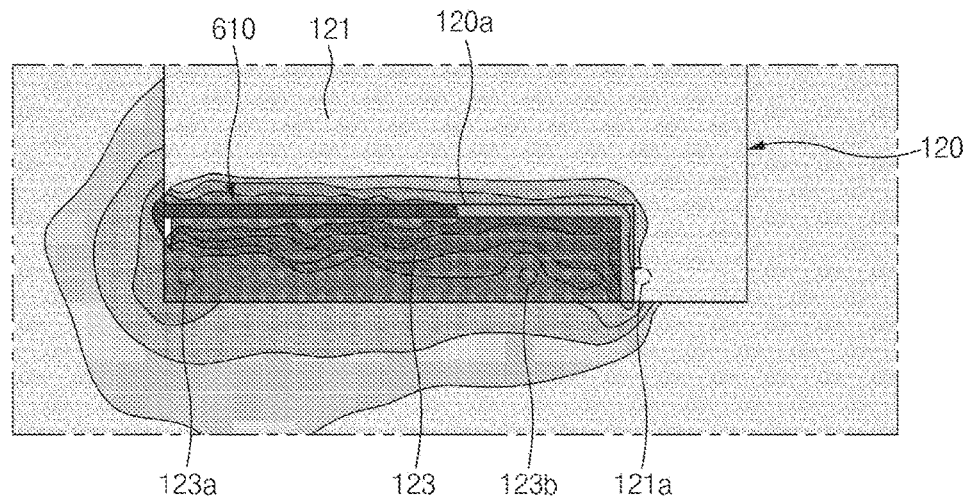
FIGS. 6A and 6B are views illustrating a current distribution of an electronic device according to an embodiment of the disclosure, which is formed to receive a signal of a low-band frequency.
Figure 6B:
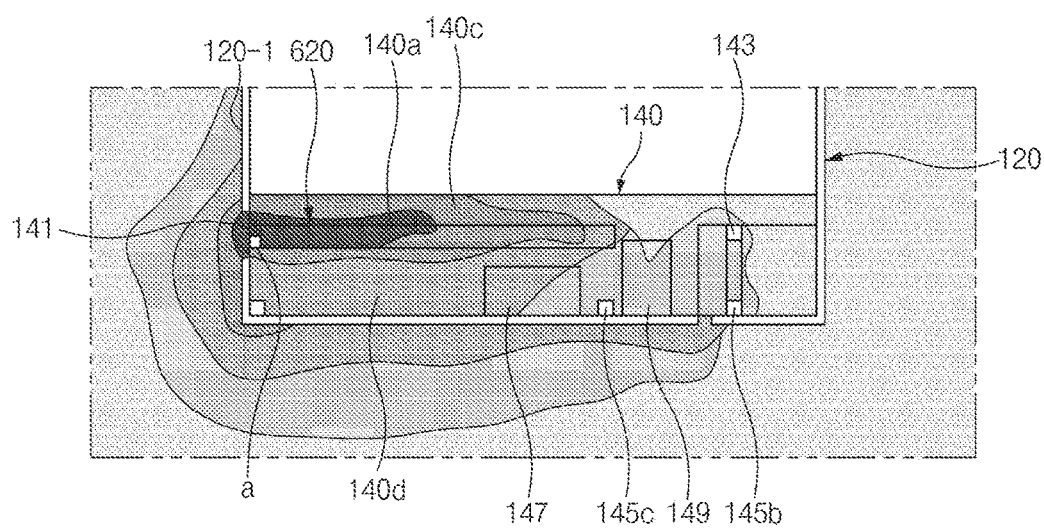

FIGS. 6A and 6B are views illustrating a current distribution of an electronic device according to an embodiment of the disclosure, which is formed to receive a signal of a low-band frequency.

Referring to FIG. 6A, a current distribution that is formed in the metal cover 120 by a current transferred through the first feeding part 141 is illustrated.

According to an embodiment, a current flowing through the metal cover 120 by the current transferred through the first feeding part 141 may be intensively distributed at an edge of the first conductive part 121 and the second conductive part 123 formed by the first slit 120a. According to an embodiment, the current flowing through the metal cover 120 by the current transferred through the first feeding part 141 may be intensively distributed in an area 610 of the edge, which is between the second point 123a and the fourth point 123b of the second conductive part 123.

According to an embodiment, the current distribution formed in the metal cover 120 by the current transferred through the first feeding part 141 may be similar to a current distribution formed in the metal cover 120 by the current transferred through the first feeding part 141, which is described with reference to FIG. 5.

Referring to FIG. 6B, a current distribution that is formed in the PCB 140 by the current transferred through the first feeding part 141 is illustrated.

According to an embodiment, a current flowing through the PCB 140 by the first feeding part 141 may be intensively distributed at an edge of the first ground plane 140c and the second ground plane 140d formed by the first slit 140a. According to an embodiment, the current flowing through the PCB 140 by the first feeding part 141 may be intensively distributed in an area 620 of the edge, which is between the first point "a", to which a current is supplied, and a point electrically connected with the second conductive part 123 through the third flexible conductive member 145c.

According to an embodiment, the current distribution formed in the PCB 140 by the current transferred through the first feeding part 141 may be similar to a current distribution formed in the PCB 140 by the first feeding part 141, which is described with reference to FIG. 5.

As such, the electronic device 100 may transmit or receive a signal of a low-band frequency (e.g., 1 GHz) through a current distributed in the metal cover 120 and the PCB 140 by the current transferred through the first feeding part 141.

Figure 7A:
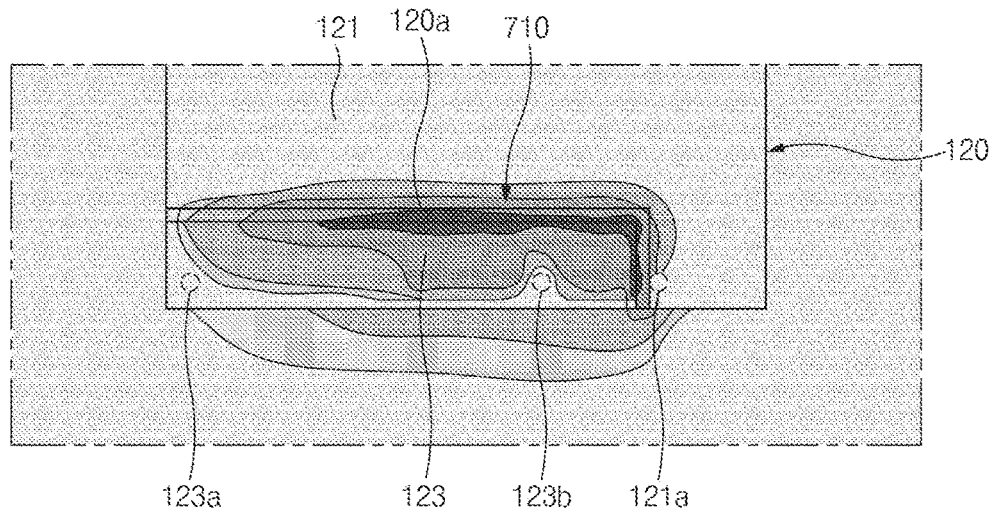
FIGS. 7A and 7B are views illustrating a current distribution of an electronic device according to an embodiment of the disclosure, which is formed to receive a signal of a high-band frequency.
Figure 7B:
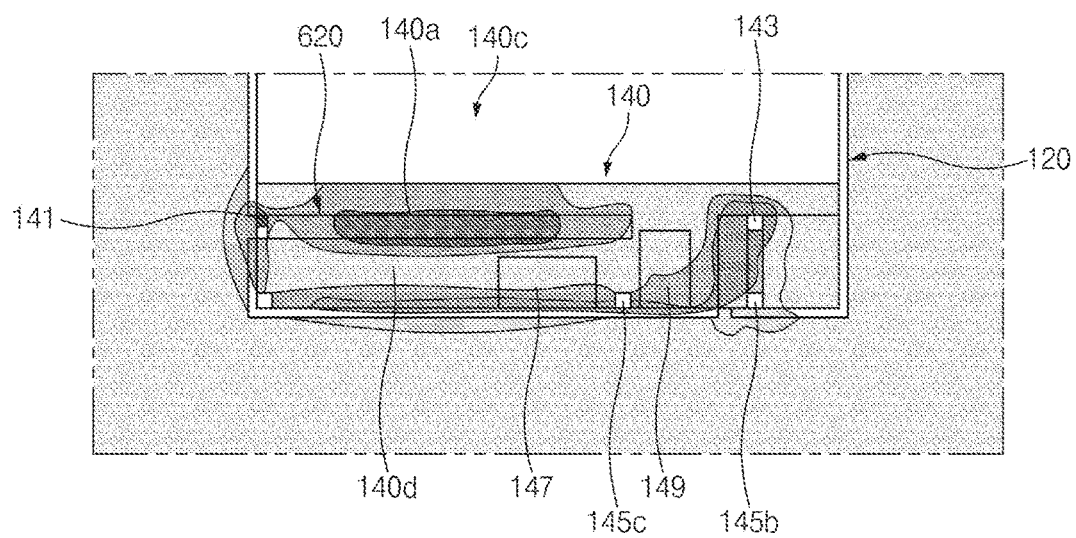

FIGS. 7A and 7B are views illustrating a current distribution of an electronic device according to an embodiment of the disclosure, which is formed to receive a signal of a high-band frequency.

Referring to FIG. 7A, there is illustrated a current distribution that is formed in the metal cover 120 by a current transferred through the second feeding part 143.

According to an embodiment, a current flowing through the metal cover 120 by the current transferred through the second feeding part 143 may be intensively distributed at an edge of the first conductive part 121 and the second conductive part 123 formed by the first slit 120a. According to an embodiment, the current flowing through the metal cover 120 by the current transferred through the second feeding part 143 may be intensively distributed in an area 710 formed along the edge from the third point 121a of the first conductive part 121.

According to an embodiment, the current distribution formed in the metal cover 120 by the current transferred through the second feeding part 143 may be similar to a current distribution formed in the metal cover 120 by the current transferred through the second feeding part 143, which is described with reference to FIG. 5.

Referring to FIG. 7B, there is illustrated a current distribution that is formed in the PCB 140 by the current transferred through the second feeding part 143.

According to an embodiment, because the second feeding part 143 is not electrically connected with the PCB 140, a current may not be distributed. According to an embodiment, a current distribution of the PCB 140 by the current transferred through the second feeding part 143 may be similar to a current distribution of the PCB 140 by the current transferred through the second feeding part 143 as illustrated in FIG. 5.

As such, the electronic device 100 may transmit or receive a signal of a high-band frequency (e.g., 2 GHz) through a current distributed in the metal cover 120 by the current transferred through the second feeding part 143.

Figure 8:
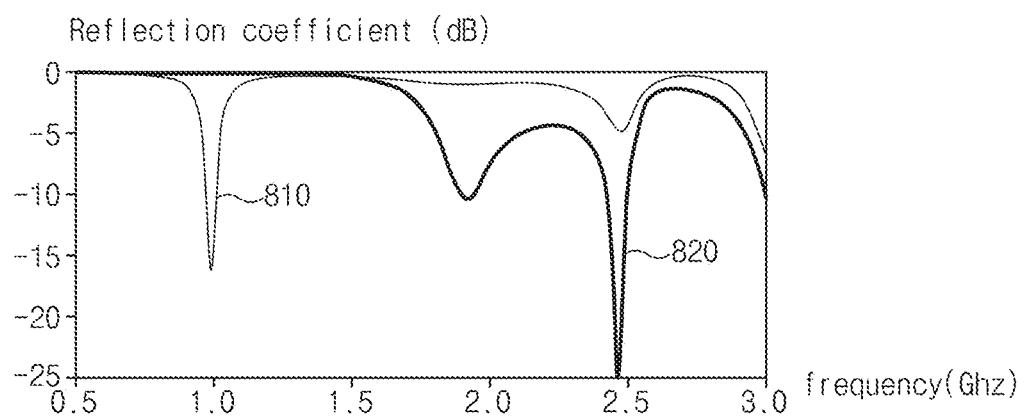
FIG. 8 is a view illustrating a reflection coefficient varying with a frequency of an electronic device according to an embodiment of the disclosure.

FIG. 8 is a view illustrating a reflection coefficient varying with a frequency of an electronic device according to an embodiment of the disclosure.

Referring to FIG. 8, the electronic device 100 may transmit or receive signals in a plurality of frequency bands.

According to an embodiment, a signal 810 that the electronic device 100 receives through an electrical path formed by a current transferred through the first feeding part 141 may be a signal of a low-band frequency. The low-band frequency may be, for example, a frequency included in a frequency band ranging from 800 MHz to 1.2 GHz.

According to an embodiment, a signal 820 that the electronic device 100 transmits/receives through an electrical path formed by a current transferred through the second feeding part 143 may be a signal of a high-band frequency. For example, the high-band frequency may be included in a frequency band ranging from 1.7 GHz to 2.7 GHz.

Figure 9:
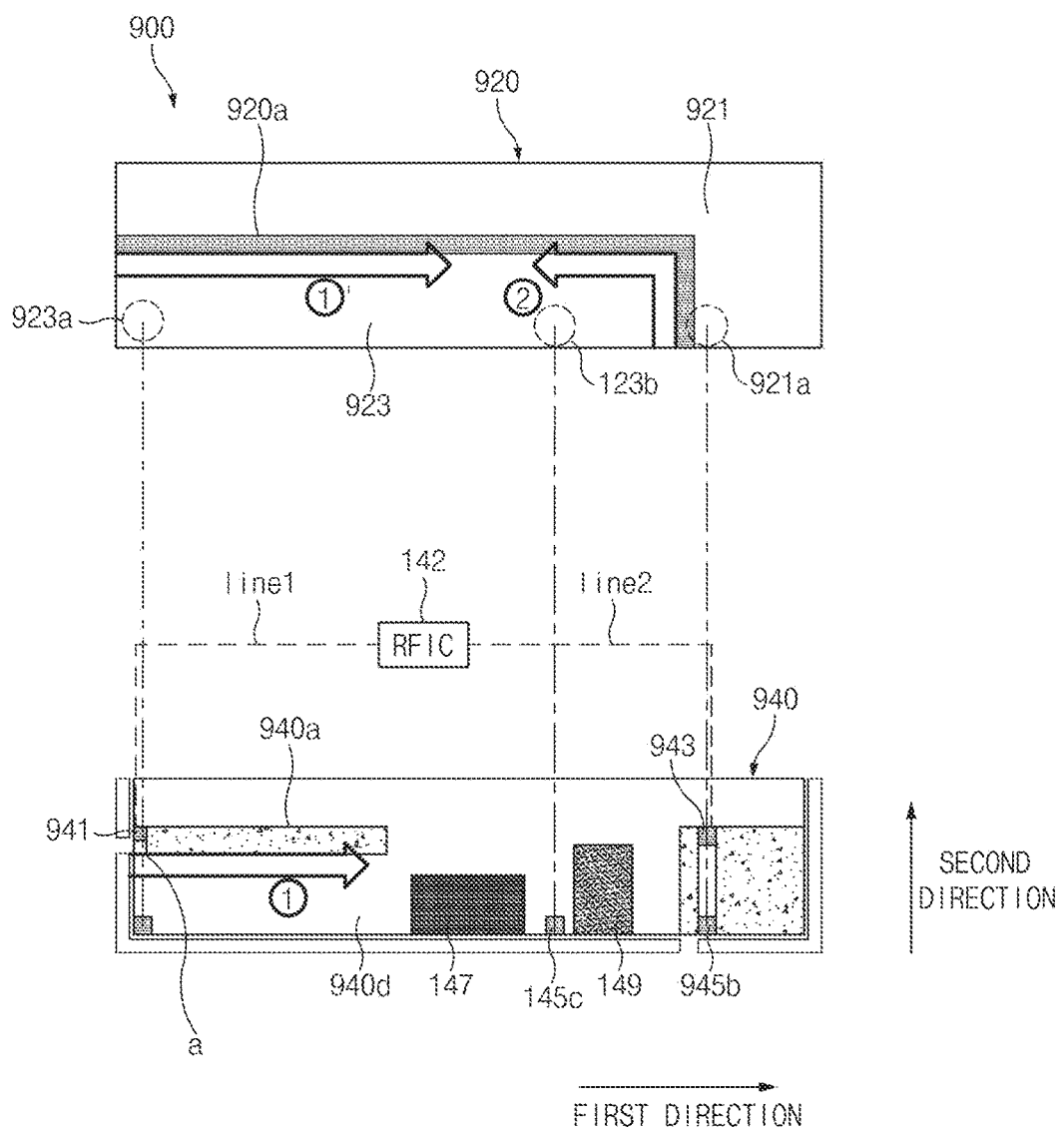
FIG. 9 is a view illustrating how to change a length of a slit of a PCB in an electronic device according to an embodiment of the disclosure.

FIG. 9 is a view illustrating how to change a length of a slit of a PCB in an electronic device according to an embodiment of the disclosure.

Referring to FIG. 9, an electronic device 900 may change a length of a slit 940a formed in a PCB 940 (e.g., may make the length short or long).

According to an embodiment, the electronic device 900 may form the slit 940a in the PCB 940 to be shorter than the first slit 140a formed in the PCB 140 illustrated in FIG. 4. Other than the size of the slit 940, the electronic device 900 may include a similar configuration as the electronic device 100.

According to an embodiment, a current transferred through a first feeding part 941 (e.g., first feeding part 141) may be supplied to a first point "a" of a second ground plane 940d to form a flow ① of a current flowing along an edge formed by the slit 940a of the PCB 940. The flow ① of the current flowing along the edge may form, for example, an electrical path shorter than the flow ① of the current flowing through the PCB 140. According to an embodiment, the first feeding part 941 may supply a current to a second point 923a (e.g., second point 123a) of a second conductive part 923 to form a flow of current ①' at an edge formed by a slit 920a (e.g., first slit 120a) of a metal cover 920 (e.g., metal cover 120).

According to an embodiment, the electronic device 900 may transmit or receive a signal of a low-band frequency through the flows of current ① and ①' formed in the metal cover 920 and the PCB 940 by the current transferred through the first feeding part 941. For example, the electronic device 900 may transmit or receive a signal of a low-band frequency higher than the electronic device 100.

According to an embodiment, a current transferred through a second feeding part 943 may be supplied to a third point 921a (e.g., third point 121a) of a first conductive part 921 (e.g., first conductive part 121) through a second flexible conductive member 945b (e.g., second flexible conductive member 145b) to form a flow ② of a current flowing along an edge formed by the slit 920a of the metal cover 920. As such, the flow of current formed by the current transferred through the second feeding part 943 may be similar to a flow of current formed by the current transferred through the second feeding part 143 illustrated in FIG. 4.

According to an embodiment, the electronic device 900 may transmit or receive a signal of a high-band frequency through the flow of current ② formed in the metal cover 920 by the current transferred through the second feeding part 943. For example, the electronic device 900 may transmit or receive a signal of a high-band frequency similar to the electronic device 100.

According to another embodiment, the electronic device 900 may further include a tuner (not illustrated) installed in the slit 940a formed in the PCB 940. For example, in the electronic device 900, the slit 940a may be formed in the PCB 940 with the same length as the first slit 140a formed in the PCB 140, and a switch or a tuner may be further installed in the slit 940a thus formed. The switch or the tuner may be controlled by the PCB 940. As such, the electronic device 900 may control the switch or the tuner to form an electrical path similar to an electrical path that is formed by changing a length of the slit 940a.

Figure 10:
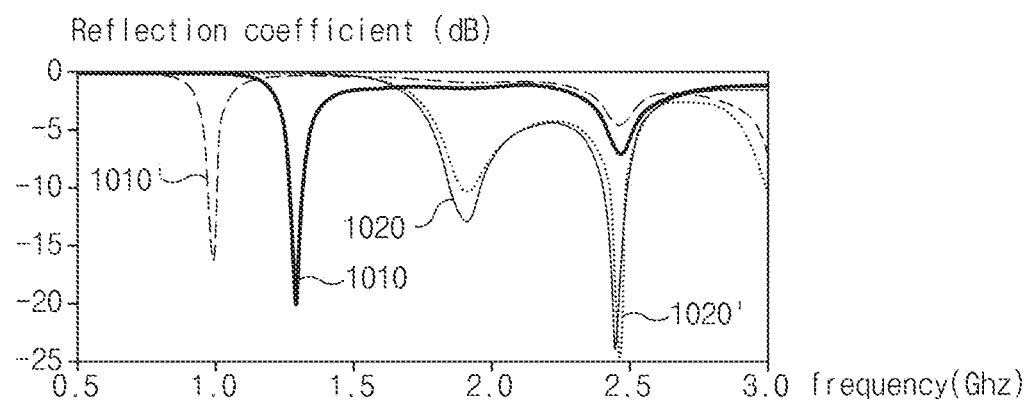
FIG. 10 is a view illustrating a reflection coefficient varying with a frequency of an electronic device according to an embodiment of the disclosure.

FIG. 10 is a view illustrating a reflection coefficient varying with a frequency of an electronic device according to an embodiment of the disclosure.

Referring to FIG. 10, an electronic device may receive signals in a plurality of frequency bands.

According to an embodiment, a signal 1010 that an electronic device (e.g., electronic device 900) receives through an electrical path formed by a current transferred through the first feeding part 941 may be a low-band frequency signal. According to an embodiment, the signal 1010 of the low-band frequency received through the electrical path may be a signal of a frequency higher than a low-band frequency of a signal 1010' received through an electrical path before changing the slit 940a of the PCB 940 to be short. The low-band frequency may be a low-band frequency (e.g., 1.3 GHz) higher than a low-band frequency (e.g., 1 GHz) of the electronic device 100.

According to an embodiment, a signal 1020 that is received through an electrical path formed by a current transferred through the second feeding part 943 of the electronic device 900 may be a high-band frequency signal. According to an embodiment, the signal 1020 of the high-band frequency received through the electrical path may be a signal of a frequency (e.g., 2.4 GHz) similar to a high-band frequency of a signal 1020' that had been received through an electrical path before changing a slit of the PCB 940 to be short.

Figure 11:
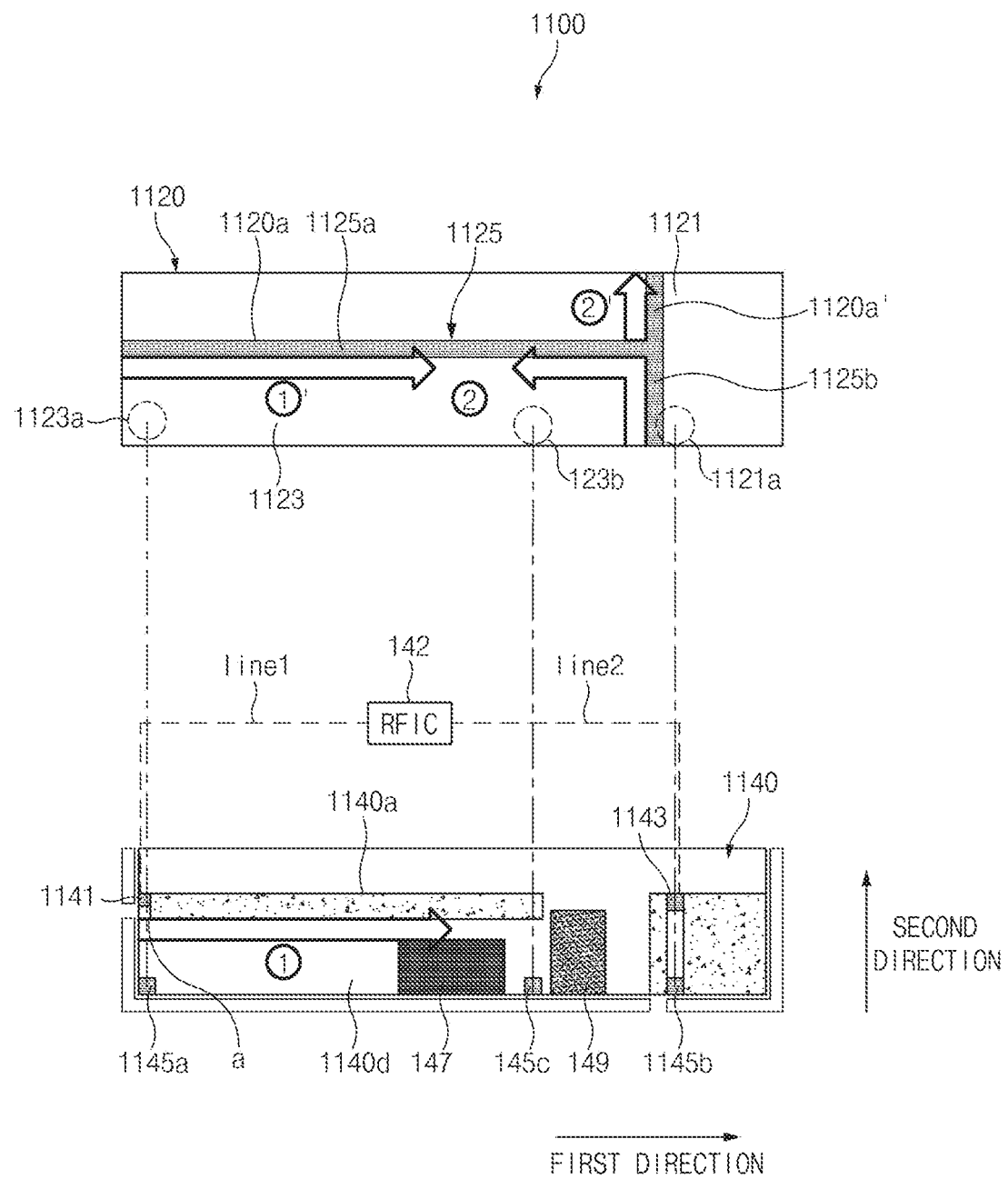
FIG. 11 is a view illustrating an example in which a length of a slit of a metal cover in an electronic device according to an embodiment of the disclosure, is changed.

FIG. 11 is a view illustrating an example in which a length of a slit of a metal cover of an electronic device according to an embodiment is changed of the disclosure.

Referring to FIG. 11, an electronic device 1100 may change a length of a slit 1120a formed in a metal cover 1120 (e.g., may make the length long). Other than the length of the slit 1120a, the electronic device 1100 may include a similar configuration as the electronic device 100.

According to an embodiment, the electronic device 1100 may form the slit 1120a, which has a shape in which the vertical slit of the first slit 120a formed in the metal cover 120 of the electronic device 100 is elongated, in the metal cover 1120. For example, the electronic device 1100 may be of a T shape in which one end of a first portion 1125a (e.g., a horizontal slit) of an insulating part 1125 formed in the metal cover 1120 is connected to the center of a second portion 1125b (e.g., a vertical slit).

According to an embodiment, a current transferred through a first feeding part 1141 (e.g., first feeding part 141) may be supplied to a first point "a" (e.g., first point "a") of a second ground plane 1140d to form a flow ① of a current flowing along an edge formed by a slit 1140a of a PCB 1140 (e.g., PCB 140). According to an embodiment, the current transferred through the first feeding part 1141 may be supplied to a second point 1123a (e.g., second point 123a) of a second conductive part 1123 (e.g., second conductive part 123) through a first flexible conductive member 1145a (e.g., first flexible conductive member 145a) to form a flow of current ①' at an edge formed by the slit 1120a of the metal cover 1120.

According to an embodiment, the electronic device 1100 may transmit or receive a low-band frequency signal through the flows of current ① and ①' formed in the metal cover 1120 and the PCB 1140 by the current transferred through the first feeding part 1141. For example, the electronic device 1100 may transmit or receive a low-band frequency signal similar to the electronic device 100.

According to an embodiment, a current transferred through a second feeding part 1143 (e.g., second feeding part 143) may be supplied to a third point 1121a (e.g., third point 121a) of a first conductive part 1121 through a second flexible conductive member 1145b (e.g., second flexible conductive member 145b) to form a flow ② of a current flowing along the edge formed by the slit 1120a of the metal cover 1120. Unlike the flow ② of the current flowing through the metal cover 120 illustrated in FIG. 4, for example, the flow ②  of the current flowing along the edge may additionally form an electrical path ②' branched along a slit 1120*a*' elongated from the second portion 1125*b* (e.g., a vertical slit) of the insulating part 1125.

According to an embodiment, the electronic device 1100 may transmit or receive a signal of a high-band frequency through the current flows ② and ②' formed in the metal cover 1120 by the current transferred through the second feeding part 1143. For example, the electronic device 1100 may transmit or receive a high-band frequency signal different from the electronic device 100.

Figure 12:
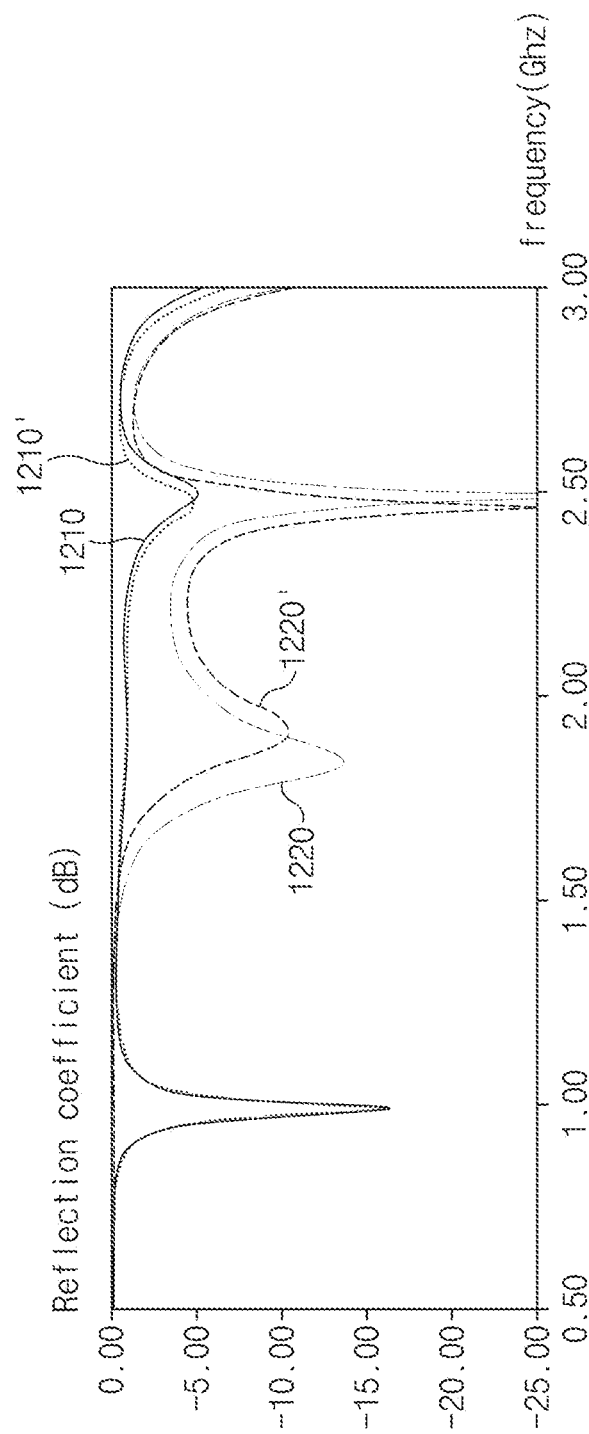
FIG. 12 is a view illustrating a reflection coefficient varying with a frequency of an electronic device according to an embodiment of the disclosure.

FIG. 12 is a view illustrating a reflection coefficient varying with a frequency of an electronic device according to an embodiment of the disclosure.

Referring to FIG. 12, the electronic device 1100 may transmit or receive signals in a plurality of frequency bands.

According to an embodiment, a signal 1210 that the electronic device 1100 receives through an electrical path formed by a current transferred through the first feeding part 1141 may be a signal of a low-band frequency. According to an embodiment, the signal 1210 of the low-band frequency received through the electrical path may be a signal of a frequency (e.g., 1 GHz) similar to a low-band frequency of a signal 1210' that is received through an electrical path before changing the slit 1140*a* of the PCB 1140.

According to an embodiment, a signal 1220 that the electronic device 1100 receives through an electrical path formed by the second feeding part 1143 may be a signal of a high-band frequency. According to an embodiment, the signal 1220 of the high-band frequency received through the electrical path may be a signal of a frequency different from a high-band frequency of a signal 1220' received through an electrical path before changing the slit 1120*a* of the metal cover 1120. For example, the signal 1220 of the high-band frequency received through the electrical path may be a signal of a frequency lower than the high-band frequency of the signal 1220' received through an electrical path before changing the slit 1120*a* of the metal cover 1120.

Figure 13:
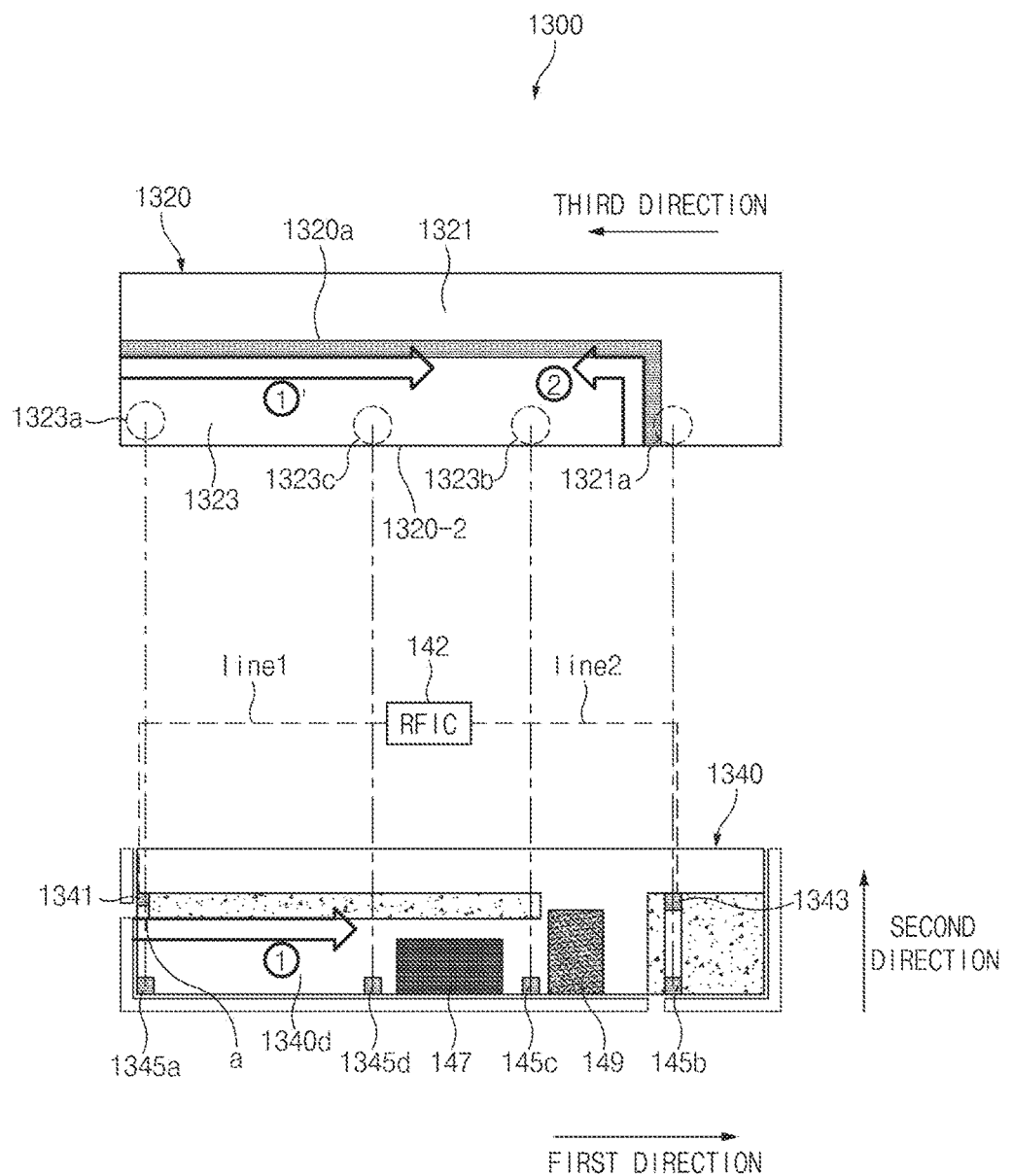
FIG. 13 is a view illustrating an example in which a ground point is added to an electronic device according to an embodiment of the disclosure.

FIG. 13 is a view illustrating an example in which a ground point is added to an electronic device according to an embodiment of the disclosure.

Referring to FIG. 13, an electronic device 1300 may be electrically connected with a second ground plane 1340*d* of a PCB 1340 at a new point on a second conductive part 1323 of a metal cover 1320. Other than different connection points, the electronic device 1300 may include a similar configuration as the electronic device 100.

According to an embodiment, the electronic device 1300 may be electrically connected to the second ground plane 1340*d* (e.g., second ground plane 140*d*) at a fourth point (or a first ground point) 1323*b* (e.g., fourth point 123*b*) and a fifth point (or a second ground point) 1323*c* of the second conductive part 1323 (e.g., second conductive part 123). The fourth point 1323*b* may be, for example, similar to the fourth point 123*b* of the second conductive part 123. The fifth point 1323*c* may be adjacent to a second periphery 1320-2 (e.g., the second periphery 120-2) of a metal cover 1320 (e.g., the metal cover 120) and may be positioned between a second point 1323*a* (e.g., second point 123*a*) and the fourth point 1323*b*. According to an embodiment, the second ground plane 1340*d* may be electrically connected with the fifth point 1323*c* through a fourth flexible conductive member 1345*d*.

According to an embodiment, a current transferred through a first feeding part 1341 may be supplied to a first point "a" (e.g., first point "a") of the second ground plane 1340*d* to form a flow ① of a current flowing along an edge formed by a slit 1340*a* (e.g., slit 140*a*) of the PCB 1340 (e.g., PCB 140). According to an embodiment, the current transferred from the first feeding part 1341 (e.g., first feeding part 141) may be supplied to the second point 1323*a* (e.g., second point 123*a*) of the second conductive part 1323 through a first flexible conductive member 1345*a* (e.g., first flexible conductive member 145*a*) to form a flow of current ①' at an edge formed by a slit 1320*a* (e.g., first slit 120*a*) of a metal cover 1320. As such, the flow of current formed by the current transferred to the first feeding part 1341 may be similar to a flow of current formed by the first feeding part 141.

According to an embodiment, the electronic device 1300 may transmit or receive a low-band frequency signal through the current flows ① and ①' formed in the metal cover 1320 and the PCB 1340 by the current transferred through the first feeding part 1341. For example, the electronic device 1300 may transmit or receive a low-band frequency signal similar to the electronic device 100.

According to an embodiment, a current transferred through a second feeding part 1343 (e.g., second feeding part 143) may be supplied to a third point 1321*a* (e.g., third point 121*a*) of a first conductive part 1321 to form a flow ② of a current flowing along the edge formed by the slit 1320*a* of the metal cover 1320. According to an embodiment, the current supplied to the third point 1321*a* may form the flow of current ② at an edge of at least one of the first conductive part 1321 and the second conductive part 1323. For example, the flow of current ② may be formed in the second direction and the third direction along the edge. The flow of current ② formed along the edge may be hindered by the fifth point 1323*c* electrically connected with the second ground plane 1340*d*. At least a portion of the flow of current ② formed in the third direction along the edge, for example, a flow of current to the fifth point 1323*c* may be changed. In other words, at least a portion of the flow of current ② formed in the third direction along the edge may be formed toward the fifth point 1323*c*.

According to an embodiment, the electronic device 1300 may transmit or receive a high-band frequency signal through the flow of current ② formed in the metal cover 1320 by the second feeding part 1343. For example, the electronic device 1300 may transmit or receive a signal of a high-band frequency higher than the electronic device 100.

According to another embodiment, the electronic device 1300 may further include a switch installed in the fourth flexible conductive member 1345*d* connected between the fifth point 1323*c* of the second conductive part 1323 and the second ground plane 1340*d*. The switch may turn on or off an electrical connection through the fourth flexible conductive member 1345*d*. The switch may be controlled by the PCB 1340 (e.g., a processor). As such, the electronic device 1300 may control the switch to change a signal that the electronic device 1300 may transmit or receive.

According to another embodiment, the electronic device 1300 may further include a tuner installed in the fourth flexible conductive member 1345*d* connected between the fifth point 1323*c* of the second conductive part 1323 and the second ground plane 1340*d*. The tuner may change an electrical path that is formed between the metal cover 1320 and the PCB 1340. As such, the electronic device 1300 may control the tuner to change a signal that the electronic device 1300 may transmit or receive.

Figure 14:
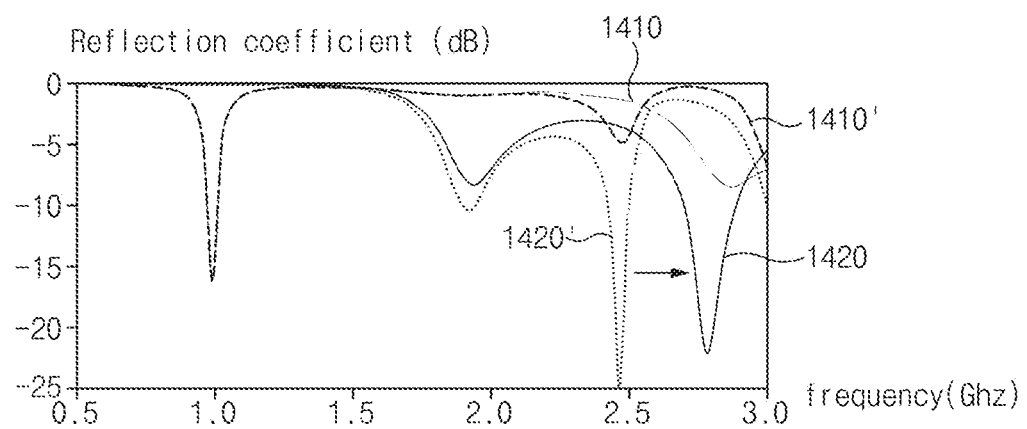
FIG. 14 is a view illustrating a reflection coefficient varying with a frequency of an electronic device according to an embodiment of the disclosure.

FIG. 14 is a view illustrating a reflection coefficient varying with a frequency of an electronic device according to an embodiment of the disclosure.

Referring to FIG. 14, the electronic device 1300 may transmit or receive signals in a plurality of frequency bands.

According to an embodiment, a signal 1410 that the electronic device 1300 receives through an electrical path formed by a current transferred through the first feeding part 1341 may be a low-band frequency signal. According to an embodiment, the low-band frequency signal 1410 received through the electrical path may be a signal of a frequency (e.g., 1 GHz) similar to a low-band frequency of a signal 1410' that has been received through an electrical path before the second ground plane 1340d is connected with the fifth point 1323c.

According to an embodiment, a signal 1420 that the electronic device 1300 receives through an electrical path formed by the second feeding part 1343 may be a high-band frequency signal. According to an embodiment, the high-band frequency signal 1420 received through the electrical path may be a signal of a frequency higher than a high-band frequency of a signal 1420' that has been received through an electrical path before the second ground plane 1340d is connected with the fifth point 1323c. The high-band frequency may be a high-band frequency (e.g., 2.75 GHz) higher than a high-band frequency (e.g., 2.4 GHz) of the electronic device 100.

Figure 15:
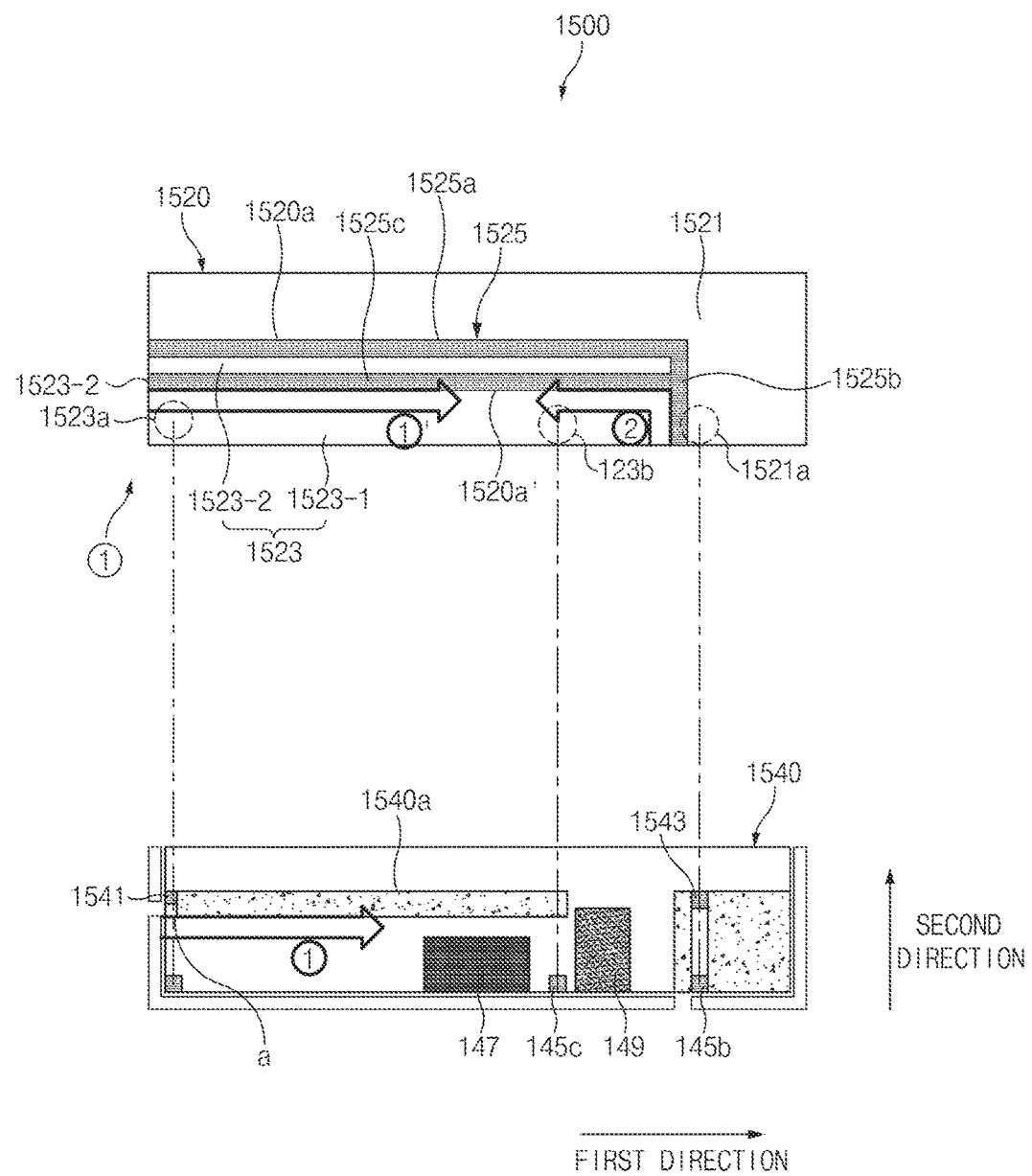
FIG. 15 is a view illustrating an example in which a horizontal slit is added to a back plate of an electronic device according to an embodiment of the disclosure.

FIG. 15 is a view illustrating an example in which a horizontal slit is added to a back plate of an electronic device according to an embodiment of the disclosure.

Referring to FIG. 15, an electronic device 1500 may add a horizontal slit 1520a' to a slit 1520a formed in a metal cover 1520. Other than a slit configuration, the electronic device 1500 may include a similar configuration as the electronic device 100.

According to an embodiment, the electronic device 1500 may additionally form a new slit in the slit 1520a of the metal cover 1520. For example, the electronic device 1500 may form the slit 1520a in the metal cover 1520 by adding the horizontal slit 1520a' to the first slit 120a formed in the metal cover 120 of the electronic device 100. For example, an insulating part 1525 formed in the metal cover 1520 may further include a third portion 1525c (e.g., a horizontal slit) parallel to a first portion 1525a, in addition to the first portion 1525a (e.g., a horizontal slit) and a second portion 1525b (e.g., second portion 125b). As such, a first conductive part 1521 may include a first portion 1523-1 and a second portion 1523-2 physically separated by the added horizontal slit 1520a'.

According to an embodiment, a current transferred through a first feeding part 1541 (e.g., first feeding part 141) may be supplied to a first point "a" of a second ground plane 1540d (e.g., second ground plane 140d) to form a flow ① of a current flowing through an edge formed by a slit 1540a (e.g., first slit 140a) of a PCB 1540. According to an embodiment, the current transferred through the first feeding part 1541 may be supplied to a second point 1523a (e.g., second point 123a) of the first portion 1523-1 of a second conductive part 1523 to form a flow of current ①' at an edge formed by the added horizontal slit 1520a' of the metal cover 1520. For example, the flow ①' of the current flowing along the edge may form an electrical path ①' of the same length as the flow of the current flowing through the metal cover 120.

According to an embodiment, the electronic device 1500 may transmit or receive a low-band frequency signal through the flows of current ① and ①' formed in the metal cover 1520 and the PCB 1540 (e.g., PCB 140) by the current transferred through the first feeding part 1541. For example, the electronic device 1500 may transmit or receive a signal of a low-band frequency (e.g., 1 GHz) similar to the electronic device 100.

According to an embodiment, a current transferred through a second feeding part 1543 (e.g., second feeding part 143) may be supplied to a third point 1521a (e.g., third point 121a) of the first conductive part 1521 to form a flow ② of a current flowing along an edge formed by the horizontal slit 1520a' of the metal cover 1520. According to an embodiment, the current transferred through the second feeding part 1543 may form the flow of current ② at an edge formed by the added horizontal slit 1520a'. The flow ② of the current flowing along the edge may form, for example, an electrical path, the length of which is shorter than that of the flow ② of the current flowing through the metal cover 120.

According to an embodiment, the electronic device 1500 may transmit or receive a low-band frequency signal through the flow of current ② formed in the metal cover 1520 by the second feeding part 1543. For example, the electronic device 1500 may transmit or receive a signal of a high-band frequency higher than the electronic device 100.

Figure 16:
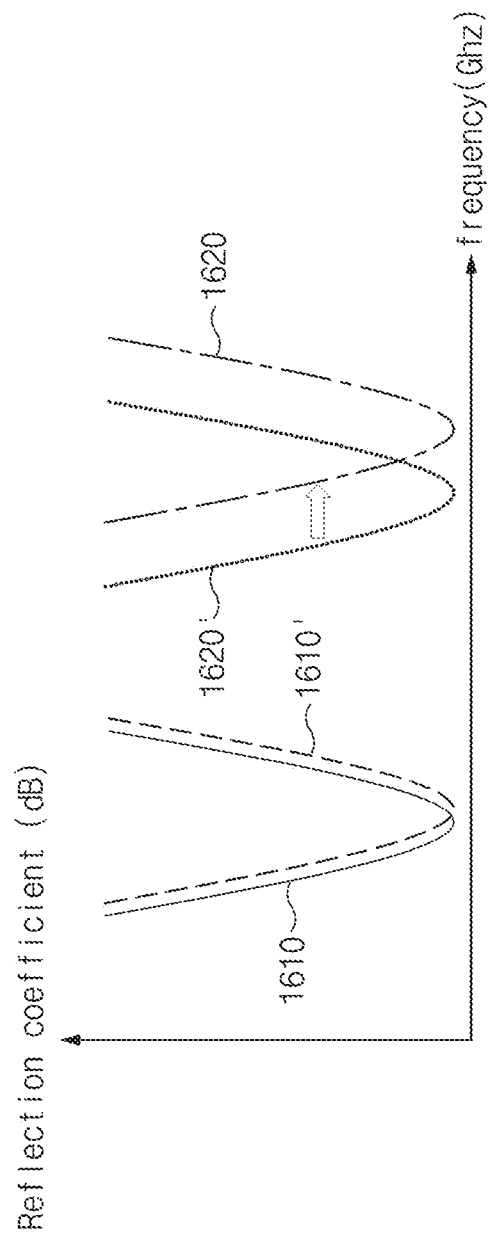
FIG. 16 is a view illustrating a reflection coefficient varying with a frequency of an electronic device according to an embodiment of the disclosure.

FIG. 16 is a view illustrating a reflection coefficient varying with a frequency of an electronic device according to an embodiment of the disclosure.

Referring to FIG. 16, the electronic device 1500 may transmit or receive signals in a plurality of frequency bands.

According to an embodiment, a signal 1610 that the electronic device 1500 receives through an electrical path formed by a current transferred through the first feeding part 1541 may be a low-band frequency signal. According to an embodiment, the signal 1610 of the low-band frequency received through the electrical path may be a signal of a frequency (e.g., 1 GHz) similar to a low-band frequency of a signal 1610' that is received through an electrical path before the horizontal slit 1520a' is added to the metal cover 1520.

According to an embodiment, a signal 1620 that the electronic device 1500 receives through an electrical path formed by a current transferred through the second feeding part 1543 may be a high-band frequency signal. According to an embodiment, the signal 1620 of the high-band frequency received through the electrical path may be a signal of a frequency higher than a high-band frequency of a signal 1620' that has been received through an electrical path before the horizontal slit 1520a' is added to the metal cover 1520. The high-band frequency may be a high-band frequency (e.g., 2.5 GHz) higher than a high-band frequency (e.g., 2 GHz) of the electronic device 100.

Figure 17:
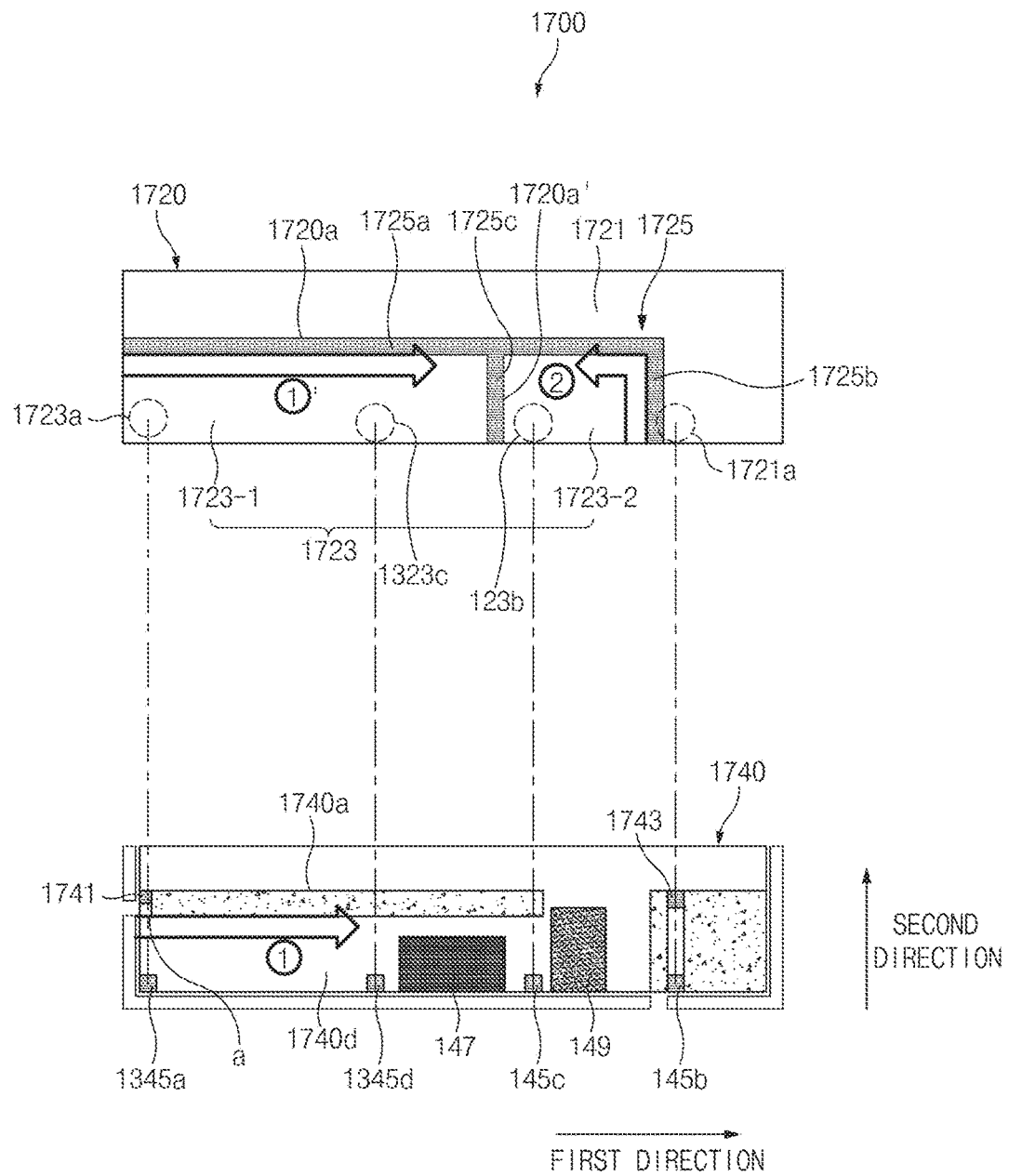
FIG. 17 is a view illustrating an example in which a vertical slit is added to a back plate of an electronic device according to an embodiment of the disclosure.

FIG. 17 is a view illustrating an example in which a vertical slit is added to a back plate of an electronic device according to an embodiment of the disclosure.

Referring to FIG. 17, an electronic device 1700 may add a vertical slit 1720a' to a slit 1720a formed in a metal cover 1720. Other than slit configuration, the electronic device 1700 may include a similar configuration as the electronic device 100.

According to an embodiment, the electronic device 1700 may additionally form a new slit in the slit 1720a (e.g., first slit 120a) of the metal cover 1720 (e.g., metal cover 120). For example, the electronic device 1700 may form the slit 1720a in the metal cover 1720 by adding the vertical slit 1720a' to the first slit 120a formed in the metal cover 120 of the electronic device 100. For example, an insulating part 1725 formed in the metal cover 1720 may further include a third portion 1725c (e.g., a vertical slit) parallel to a second portion 1725b, in addition to a first portion 1725a (e.g., a horizontal slit) and the second portion 1725*b* (e.g., second portion 1525*b*). As such, a second conductive part 1723 may include a first portion 1723-1 and a second portion 1723-2 physically separated by the added vertical slit 1720*a'*.

According to an embodiment, a first feeding part 1741 (e.g., first feeding part 141) may supply a current to a first point "a" of a second ground plane 1740*d* (e.g., second ground plane 140*d*) to form a flow ① of a current flowing along an edge formed by a slit 1740*a* (e.g., first slit 140*a*) of a PCB 1740 (e.g., PCB 140). According to an embodiment, the first feeding part 1741 may supply a current to a second point 1723*a* (e.g., second point 123*a*) of the first portion 1723-1 of the second conductive part 1723 to form a flow of current ①' at an edge formed by the slit 1720*a* of the metal cover 1720. Unlike the flow ①' of the current flowing along the edge of the metal cover 120, for example, the flow ①' of the current flowing along the edge may form an electrical path branched into the newly added slit 1720*a'*.

According to an embodiment, the electronic device 1700 may transmit or receive a low-band frequency signal through the flows of current ① and ①' formed in the metal cover 1720 and the PCB 1740 by the current transferred through the first feeding part 1741. For example, the electronic device 1700 may transmit or receive a signal of a low-band frequency lower than the electronic device 100.

According to an embodiment, a second feeding part 1743 (e.g., second feeding part 143) may supply a current to a third point 1721*a* (e.g., third point 121*a*) of a first conductive part 1721 to form a flow ② of a current flowing along an edge formed by the slit 1720*a* of the metal cover 1720. As such, the flow of current formed by the second feeding part 1743 may be similar to a flow of current formed by the second feeding part 143 illustrated in FIG. 4.

According to an embodiment, the electronic device 1700 may transmit or receive a signal of a high-band frequency through the flow of current ② formed in the metal cover 1720 by the current transferred through the second feeding part 1743. For example, the electronic device 1700 may transmit or receive a signal of a high-band frequency similar to the electronic device 100.

Figure 18:
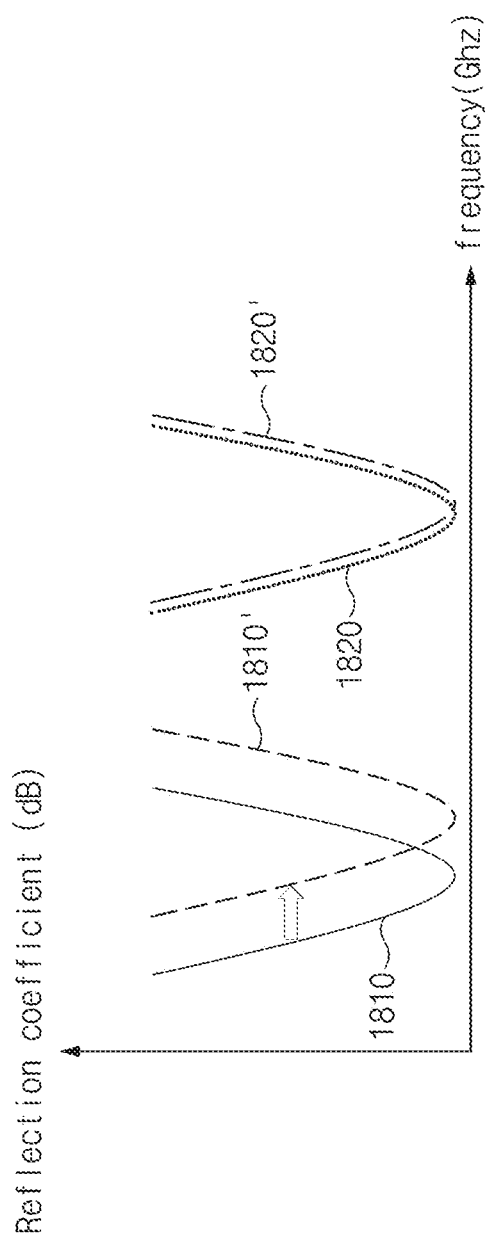
FIG. 18 is a view illustrating a reflection coefficient varying with a frequency of an electronic device according to an embodiment of the disclosure.

FIG. 18 is a view illustrating a reflection coefficient varying with a frequency of an electronic device according to an embodiment of the disclosure.

Referring to FIG. 18, the electronic device 1700 may transmit or receive signals in a plurality of frequency bands.

According to an embodiment, a signal 1810 that the electronic device 1700 receives through an electrical path formed by a current transferred through the first feeding part 1741 may be a low-band frequency signal. According to an embodiment, the signal 1810 of the low-band frequency received through the electrical path may be a signal of a frequency lower than a low-band frequency of a signal 1810' received through an electrical path before the new vertical slit 1720*a'* is added to the slit 1720*a* of the metal cover 1720. The low-band frequency may be a low-band frequency (e.g., 0.8 GHz) lower than a low-band frequency (e.g., 1 GHz) of the electronic device 100.

According to an embodiment, a signal 1820 that the electronic device 1700 receives through an electrical path formed by a current transferred through the second feeding part 1743 may be a high-band frequency signal. According to an embodiment, the signal 1820 of the high-band frequency received through the electrical path may be a signal of a frequency similar to a high-band frequency of a signal 1820' received through an electrical path before the new vertical slit 1720*a'* is added to the slit 1720*a* of the metal cover 1720.

By using a metal cover and a PCB, in which slits are formed, as a radiator, the electronic device 100 according to various embodiments of the disclosure described with reference to FIGS. 1 to 18 may change shapes of the slits formed in the metal cover and the PCB to easily control a resonant frequency of an antenna radiator and may transmit or receive signals in various frequency bands.

Figure 19A:
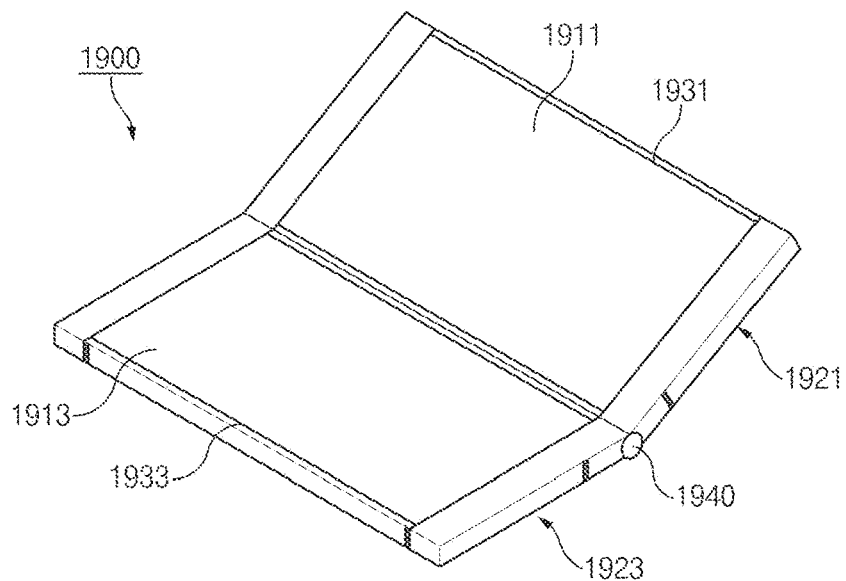
FIGS. 19A and 19B are views illustrating an example in which an electronic device according to an embodiment of the disclosure, includes a foldable display.
Figure 19B:
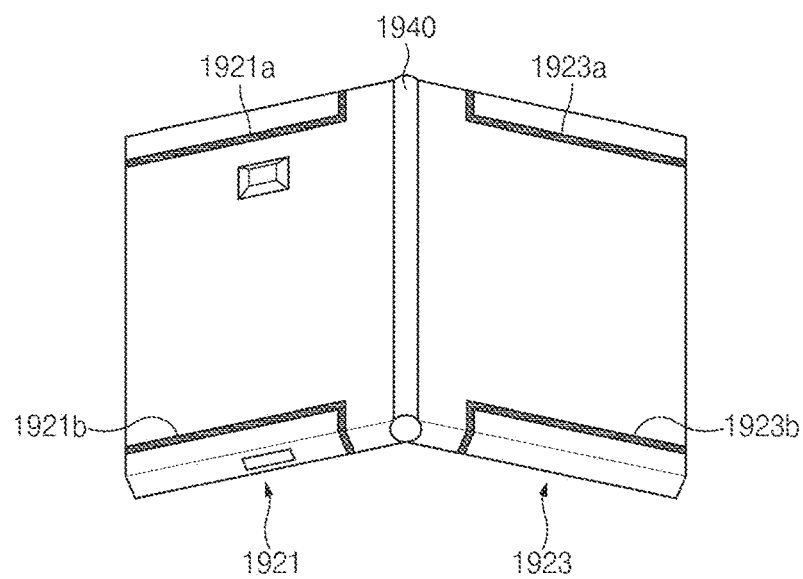

FIGS. 19A and 19B are views illustrating an example in which an electronic device according to an embodiment of the disclosure, includes a foldable display.

Referring to FIGS. 19A and 19B, an electronic device 1900 may include a foldable display including a first display 1931 and a second display 1933.

According to an embodiment, the electronic device 1900 may include a first housing where the first display 1931 may be positioned and a second housing where the second display 1933 may be positioned. The first housing may include a first glass cover 1911 and a first metal cover 1921. The second housing may include a second glass cover 1913 and a second metal cover 1923. According to an embodiment, the electronic device 1900 may include a first PCB (not illustrated) and a second PCB (not illustrated) respectively positioned within the first housing and the second housing.

According to an embodiment, the electronic device 1900 may include a hinge 1940 that connects the first housing and the second housing to implement a foldable structure. As such, in the electronic device 1900, it may be difficult to integrally form slits in the first metal cover 1921 and the second metal cover 1923 physically separated, for the purpose of receiving signals in a plurality of frequency bands including a specified frequency signal in a low-band.

According to an embodiment, a plurality of slits 1921*a*, 1921*b*, 1923*a*, and 1923*b* having an L shape may be formed in the first metal cover 1921 of the first housing and the second metal cover 1923 of the second housing. For example, a first slit 1921*a* and a second slit 1921*b* may be formed at an upper portion and a lower portion of the first metal cover 1921. Also, a third slit 1923*a* and a fourth slit 1923*b* may be formed at an upper portion and a lower portion of the second metal cover 1923. According to an embodiment, a slit may be formed in each of the first PCB (not illustrated) and the second PCB (not illustrated). For example, like the PCB 140 of the electronic device 100, a slit may be formed in each of the first PCB and the second PCB. The slit formed in each of the first PCB and the second PCB may be formed at a position corresponding to a horizontal slit of each of the first slit 1921*a*, the second slit 1921*b*, the third slit 1923*a*, and the fourth slit 1923*b*. For example, like the PCB 140 of the electronic device 100, the slits of the first PCB and the second PCB may be formed at positions corresponding to horizontal slits of the first metal cover 1921 and the second metal cover 1923.

As such, the electronic device 1900 may receive signals in a plurality of frequency bands by using the first metal cover 1921, the second metal cover 1923, the first PCB, and the second PCB as an antenna radiator.

Figure 20A:
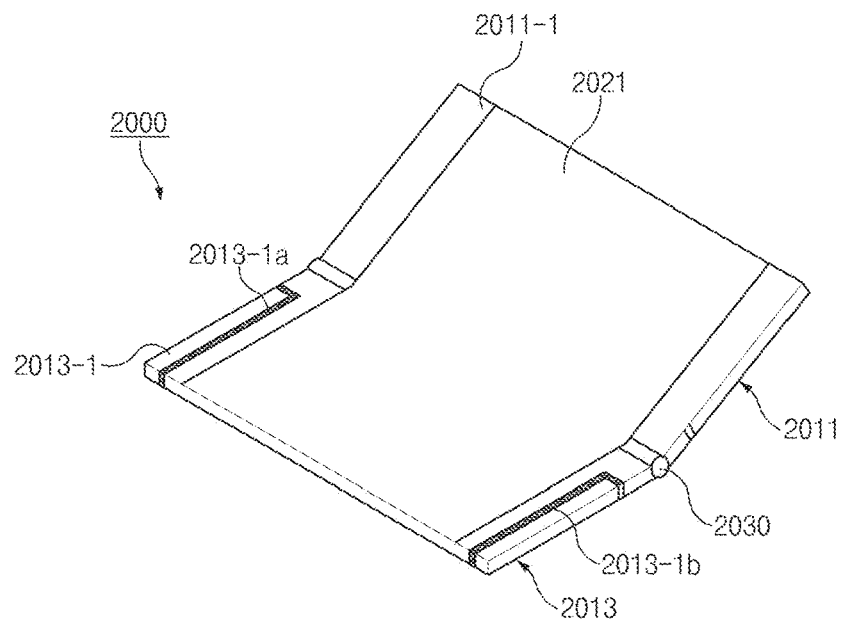
FIGS. 20A and 20B are views illustrating an example in which an electronic device according to an embodiment of the disclosure, includes a flexible display.
Figure 20B:
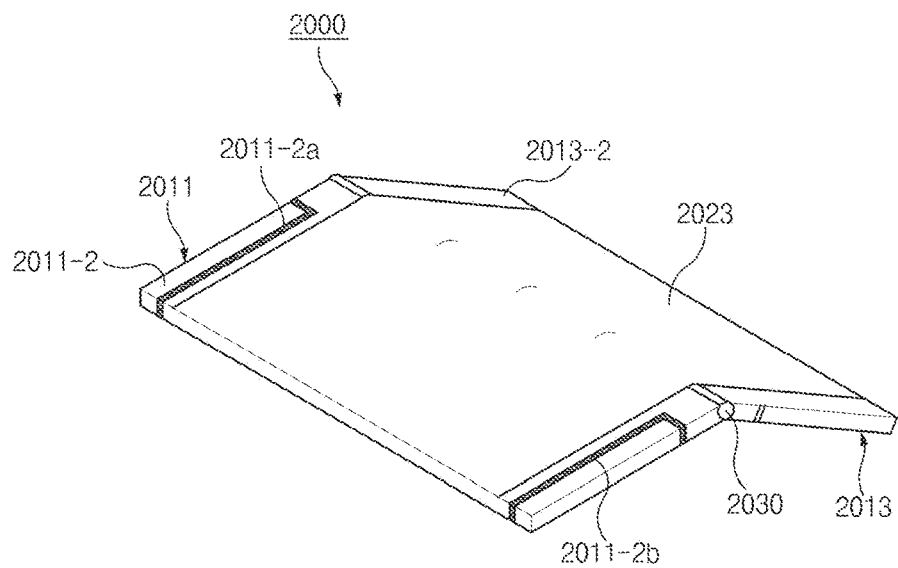

FIGS. 20A and 20B are views illustrating an example in which an electronic device according to an embodiment of the disclosure, includes a flexible display.

Referring to FIGS. 20A and 20B, an electronic device 2000 may include a first flexible display 2021 positioned on a front surface and a second flexible display 2023 positioned on a back surface.

According to an embodiment, the electronic device 2000 may include a first metal housing 2011 and a second metal housing 2013. The first metal housing 2011 may include a first front plate 2011-1 and a first back plate 2011-2. The second metal housing 2013 may include a second front plate 2013-1 and a second back plate 2013-2. According to an embodiment, the first flexible display 2021 positioned on the front surface of the electronic device 2000 may be positioned within the first metal housing 2011 and the second metal housing 2013. According to an embodiment, the second flexible display 2023 positioned on the back surface of the electronic device 2000 may be positioned within the first metal housing 2011 and the second metal housing 2013. According to an embodiment, the electronic device 2000 may include a first PCB (not illustrated) and a second PCB (not illustrated) respectively positioned within the first metal housing 2011 and the second metal housing 2013.

According to an embodiment, the electronic device 2000 may include a hinge 2030 that connects the first metal housing 2011 and the second metal housing 2013 to implement a flexible structure. As such, in the electronic device 2000, it may be difficult to integrally form slits in the first metal housing 2011 and the second metal housing 2013 physically separated, for the purpose of receiving signals in a plurality of frequency bands including a specified frequency signal in a low-band.

According to an embodiment, L-shaped slits may be respectively formed at an upper portion and a lower portion of the first back plate 2011-2 of the first metal housing 2011. A first slit 2011-2a and a second slit 2011-2b may be respectively formed at the upper portion and the lower portion of the first back plate 2011-2.

According to an embodiment, L-shaped slits may be respectively formed at an upper portion and a lower portion of the second front plate 2013-1 of the second metal housing 2013. A third slit 2013-1a and a fourth slit 2013-1b may be respectively formed at the upper portion and the lower portion of the second front plate 2013-1.

According to an embodiment, a slit may be formed in each of the first PCB (not illustrated) and the second PCB (not illustrated). The slit formed in each of the first PCB and the second PCB may be formed at a position corresponding to a horizontal slit of each of the first slit 2011-2a, the second slit 2011-2b, the third slit 2013-1a, and the fourth slit 2013-1b.

As such, the electronic device 2000 may receive signals in a plurality of frequency bands by using the first metal housing 2011, the second metal housing 2013, the first PCB (not illustrated), and the second PCB (not illustrated) as an antenna radiator.

An electronic device (e.g., electronic device 100, electronic device 900, electronic device 1100, electronic device 1300, electronic device 1500, electronic device 1700, electronic device 1900, or electronic device 2000) according to various embodiments of the disclosure may include a housing that includes a front plate and a back plate facing away from the front plate, a display that is positioned within the housing and is exposed through the front plate, and a PCB that is interposed between the front plate and the back plate. The back plate may have a quadrangular shape including a first periphery elongated in a first direction and a second periphery shorter than the first periphery and elongated in a second direction perpendicular to the first direction and may include a first conductive part that has a quadrangular cutting elongated from a corner in the second direction, when viewed from above the back plate, a second conductive part that is positioned in the cutting, when viewed from above the back plate, and an insulating part of an L shape that is elongated between the first conductive part and the second conductive part, when viewed from above the back plate, and contacts the first conductive part and the second conductive part. The PCB may include a first ground plane that is interposed between the first conductive part and the front plate, is elongated in the second direction, and is spaced apart from the second periphery, a second ground plane that is electrically connected with the first ground plane, and at least one radio frequency communication circuit that is electrically connected to a first point on the first ground plane adjacent to the first periphery and a second point on the first conductive part adjacent to the second periphery. The second ground plane may be elongated in the second direction parallel to the second conductive part between the second conductive part and the front plate, and at least a portion of the second ground plane may be elongated and may be separated from an edge of the first ground plane by a slit elongated in the second direction along a portion of the insulating part.

The electronic device according to an embodiment of the disclosure may further include a first flexible conductive member that is adjacent to at least one of the first periphery and the second periphery and is positioned between the second ground plane and a third point on the second conductive part.

The electronic device according to an embodiment of the disclosure may further include a second flexible conductive member that is positioned between the second ground plane and a fourth point of the second conductive part, which is positioned between the second point and the third point along the second periphery, when viewed from above the back plate.

An electronic device (e.g., electronic device 100, electronic device 900, electronic device 1100, electronic device 1300, electronic device 1500, electronic device 1700, electronic device 1900, or electronic device 2000 of FIG. 1) according to various embodiments of the disclosure may include a housing that includes a front plate and a back plate facing away from the front plate, a display that is positioned within the housing and is exposed through the front plate, and at least one PCB that is interposed between the front plate and the back plate. The back plate may have a quadrangular shape including a first periphery elongated in a first direction and a second periphery shorter than the first periphery and elongated in a second direction perpendicular to the first direction and may include a first conductive part that has a quadrangular cutting elongated from a corner of the back plate in the second direction, when viewed from above the back plate, a second conductive part that is positioned in the cutting, when viewed from above the back plate, and an insulating part of an L shape that is elongated between the first conductive part and the second conductive part, when viewed from above the back plate, and contacts the first conductive part and the second conductive part. The at least one PCB may include a first ground plane that is interposed between the first conductive part and the front plate, a second ground plane that is electrically connected with the first ground plane, and at least one radio frequency communication circuit that is electrically connected to a first point on the first ground plane adjacent to the first periphery, a second point on the second conductive part adjacent to at least one of the first periphery and the second periphery, and a third point on the first conductive part adjacent to the second periphery. The second ground plane may be elongated in the second direction parallel to the second conductive part between the second conductive part and the front plate, and at least a portion of the second ground plane may be elongated and may be separated from an edge of the first ground plane by a slit.

According to an embodiment of the disclosure, a slit formed in the second ground plane is elongated along a portion of the insulating part.

According to an embodiment of the disclosure, the second ground plane may be electrically connected to a fourth point on the second conductive part, and the fourth point may be positioned between the second point and the third point along the second periphery, when viewed from above the back plate.

The electronic device according to an embodiment of the disclosure may further include a first flexible conductive member that is positioned between the second ground plane and the fourth point on the second conductive part.

According to an embodiment of the disclosure, the first flexible conductive member may be a C-clip.

According to an embodiment of the disclosure, the second ground plane may be electrically connected to a fifth point on the second conductive part, and the fifth point may be positioned between the second point and the fourth point along the second periphery, when viewed from above the back plate.

The electronic device according to an embodiment of the disclosure may further include a second flexible conductive member that is positioned between the second ground plane and the fifth point on the second conductive part.

The electronic device according to an embodiment of the disclosure may further include a switch that turns on or off an electrical connection through the second flexible conductive member, and a processor included in the at least one PCB may control the on or off of the switch.

The electronic device according to an embodiment of the disclosure may further include a tuner installed in the second flexible conductive member, and a processor included in the at least one PCB may control the tuner.

The electronic device according to an embodiment of the disclosure may further include a switch that is installed in a slit formed in the second ground plane to change a length of the slit, and a processor included in the at least one PCB may control the switch.

An electronic device (e.g., electronic device 100, electronic device 900, electronic device 1100, electronic device 1300, electronic device 1500, electronic device 1700, electronic device 1900, or electronic device 2000) according to various embodiments of the disclosure may include a housing that includes a front plate and a back plate facing away from the front plate, a display that is positioned within the housing and is exposed through the front plate, and at least one PCB that is interposed between the front plate and the back plate. The back plate may have a quadrangular shape including a first periphery elongated in a first direction and a second periphery shorter than the first periphery and elongated in a second direction perpendicular to the first direction and may include a first conductive part and a second conductive part that are separated by a first slit, and an insulating part that is formed in the first slit and contacts the first conductive part and the second conductive part. The at least one PCB may include a first ground plane that is interposed between the first conductive part and the front plate, a second ground plane that is electrically connected with the first ground plane, and at least one radio frequency communication circuit that is electrically connected to a first point on the first ground plane adjacent to the first periphery, a second point on the second conductive part adjacent to at least one of the first periphery and the second periphery, and a third point on the first conductive part adjacent to the second periphery. The second ground plane may be elongated in the second direction parallel to the second conductive part between the second conductive part and the front plate, and at least a portion of the second ground plane may be elongated and may be separated from an edge of the first ground plane by a second slit.

According to an embodiment of the disclosure, the first slit may include a first portion and a second portion elongated and formed in a direction different from the first portion.

According to an embodiment of the disclosure, the first portion may be parallel to the first direction, and the second portion may be parallel to the second direction.

According to an embodiment of the disclosure, the first slit may be of an L shape in which one end of the first portion is connected with one end of the second portion.

According to an embodiment of the disclosure, the first slit may be of a T shape in which one end of the first portion is connected to a center of the second portion.

According to an embodiment of the disclosure, the first slit may further include a third portion that is elongated and formed in a direction parallel to the first portion.

According to an embodiment of the disclosure, the first slit may further include a third portion that is elongated and formed in a direction parallel to the first portion.

Figure 21:
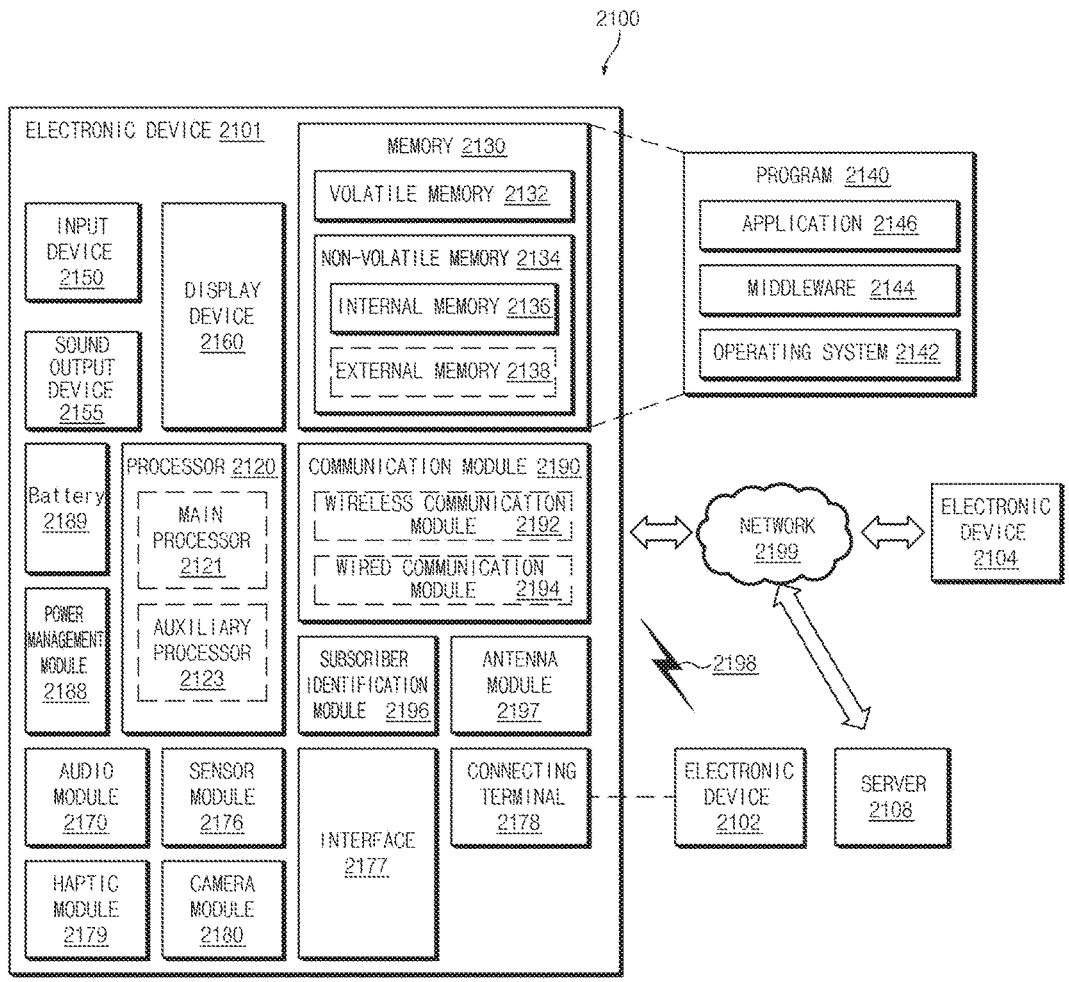
FIG. 21 is a block diagram illustrating an electronic device in a network environment according to various embodiments of the disclosure.

FIG. 21 is a block diagram illustrating an electronic device 2101 in a network environment 2100 according to various embodiments of the disclosure.

Referring to FIG. 21, the electronic device 2101 in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input device 2150, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) 2196, or an antenna module 2197. In some embodiments, at least one (e.g., the display device 2160 or the camera module 2180) of the components may be omitted from the electronic device 2101, or one or more other components may be added in the electronic device 2101. In some embodiments, some of the components may be implemented as single integrated circuitry. For example, the sensor module 2176 (e.g., a fingerprint sensor, an iris sensor, an illuminance sensor, etc.) may be implemented as embedded in the display device 2160 (e.g., a display).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may load a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), and an auxiliary processor 2123 (e.g., a graphics processing unit (GPU), an image signal processor (ISP), a sensor hub processor, or a communication processor (CP)) that is operable independently from, or in conjunction with, the main processor 2121. Additionally, or alternatively, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display device 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 2123.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 may receive a command or data to be used by another component (e.g., the processor 2120) of the electronic device 2101, from the outside (e.g., a user) of the electronic device 2101. The input device 2150 may include, for example, a microphone, a mouse, or a keyboard.

The sound output device 2155 may output sound signals to the outside of the electronic device 2101. The sound output device 2155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 2160 may visually provide information to the outside (e.g., a user) of the electronic device 2101. The display device 2160 may include, for example, a display, a hologram device, or a projector and control circuitry to control a corresponding one of the display, hologram device, and projector. According to an embodiment, the display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. According to an embodiment, the audio module 2170 may obtain the sound via the input device 2150, or output the sound via the sound output device 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector), The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device 2102 via the first network 2198 (e.g., a short-range communication network, such as Bluetooth™, wireless-fidelity (Wi-Fi) direct, or infrared data association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the SIM 2196.

The antenna module 2197 may transmit or receive a signal or power to or from the outside (e.g., the external electronic device 2102) of the electronic device 2101. According to an embodiment, the antenna module 2197 may include one or more antennas, and, therefrom, at least one antenna appropriate for a communication scheme used in the communication network, such as the first network 2198 or the second network 2199, may be selected, for example, by the communication module 2190 (e.g., the wireless communication module 2192). The signal or the power may then be transmitted or received between the communication module 2190 and the external electronic device 2102 via the selected at least one antenna.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 and 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices 2102, 2104, or 2108 to perform at least part of the function or the service. The one or more external electronic devices 2102, 2104, or 2108 receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

Figure 22:
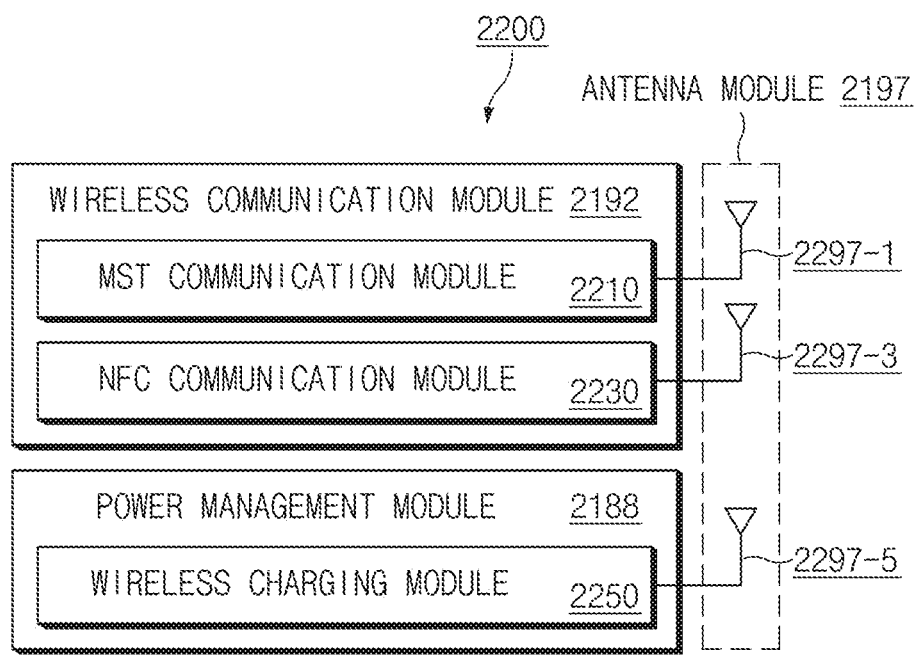
FIG. 22 is a block diagram illustrating a wireless communication module, a power management module, and an antenna module of an electronic device according to various embodiments of the disclosure.

FIG. 22 is a block diagram 2200 illustrating the wireless communication module 2192, the power management module 2188, and the antenna module 2197 of the electronic device 2101 according to various embodiments of the disclosure.

Referring to FIG. 22, the wireless communication module 2192 may include a magnetic secure transmission (MST) communication module 2210 or a near-field communication (NFC) module 2230, and the power management module 2188 may include a wireless charging module 2250. In such a case, the antenna module 2197 may include a plurality of antennas that include a MST antenna 2297-1 connected with the MST communication module 2210, a NFC antenna 2297-3 connected with the NFC communication module 2230, and a wireless charging antenna 2297-5 connected with the wireless charging module 2250. For ease of description, the same components as those described in regard to FIG. 21 are briefly described or omitted from the description.

The MST communication module 2210 may receive a signal containing control information or payment information such as card information from the processor 2120, generate a magnetic signal corresponding to the received signal, and then transfer the generated magnetic signal to the external electronic device 2102 (e.g., a point-of-sale (POS) device) via the MST antenna 2297-1. To generate the magnetic signal, according to an embodiment, the MST communication module 2210 may include a switching module (not shown) that includes one or more switches connected with the MST antenna 2297-1, and control the switching module to change the direction of voltage or current supplied to the MST antenna 2297-1 according to the received signal. The change of the direction of the voltage or current allows the direction of the magnetic signal (e.g., a magnetic field) emitted from the MST antenna 2297-1 to change accordingly. If detected at the external electronic device 2102, the magnetic signal with its direction changing may cause an effect (e.g., a waveform) similar to that of a magnetic field that is generated when a magnetic card corresponding to the card information associated with the received signal is swiped through a card reader of the electronic device 2102. According to an embodiment, for example, payment-related information and a control signal that are received by the electronic device 2102 in the form of the magnetic signal may be further transmitted to an external server 2108 (e.g., a payment server) via the second network 2199.

The NFC communication module 2230 may obtain a signal containing control information or payment information such as card information from the processor 2120 and transmit the obtained signal to the external electronic device 2102 via the NFC antenna 2297-3. According to an embodiment, the NFC communication module 2230 may receive such a signal transmitted from the external electronic device 2102 via the NFC antenna 2297-3.

The wireless charging module 2250 may wirelessly transmit power to the external electronic device 2102 (e.g., a cellular phone or wearable device) via the wireless charging antenna 2297-5, or wirelessly receive power from the external electronic device 2102 (e.g., a wireless charging device). The wireless charging module 2250 may support one or more of various wireless charging schemes including, for example, a magnetic resonance scheme or a magnetic induction scheme.

According to an embodiment, some of the MST antenna 2297-1, the NFC antenna 2297-3, or the wireless charging antenna 2297-5 may share at least part of their radiators. For example, the radiator of the MST antenna 2297-1 may be used as the radiator of the NFC antenna 2297-3 or the wireless charging antenna 2297-5, or vice versa. In such a case, the antenna module 2197 may include a switching circuit (not shown) adapted to selectively connect (e.g., close) or disconnect (e.g. open) at least part of the antennas 2297-1, 2297-3, or 2297-5, for example, under the control of the wireless communication module 2192 (e.g., the MST communication module 2210 or the NFC communication module 2230) or the power management module (e.g., the wireless charging module 2250). For example, when the electronic device 2101 uses a wireless charging function, the NFC communication module 2230 or the wireless charging module 2250 may control the switching circuit to temporarily disconnect at least one portion of the radiators shared by the NFC antenna 2297-3 and the wireless charging antenna 2297-5 from the NFC antenna 2297-3 and to connect the at least one portion of the radiators with the wireless charging antenna 2297-5.

According to an embodiment, at least one function of the MST communication module 2210, the NFC communication module 2230, or the wireless charging module 2250 may be controlled by an external processor (e.g., the processor 2120). According to an embodiment, at least one specified function (e.g., a payment function) of the MST communication module 2210 or the NFC communication module 2230 may be performed in a trusted execution environment (TEE). According to an embodiment, the TEE may form an execution environment in which, for example, at least some designated area of the memory 2130 is allocated to be used for performing a function (e.g., a financial transaction or personal information-related function) that requires a relatively high level of security. In such a case, access to the at least some designated area of the memory 2130 may be restrictively permitted, for example, according to an entity accessing thereto or an application being executed in the TEE.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, by using a metal cover and a PCB, in which slits are formed, as an antenna radiator, an electronic device may change shapes of the slits formed in the metal cover and the PCB to easily control a resonant frequency of an antenna radiator and may transmit or receive signals in various frequency bands.

According to various embodiments, a foldable electronic device and a flexible electronic device that have a structural limitation on a metal housing capable of being used as an antenna radiator may receive signals in a plurality of frequency bands by forming a slit at the metal housing.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

A thickness of a portable electronic device is gradually decreasing; however, the area occupied by components that are necessary to provide a service to a user and include a display is increasing, or the number of components that are necessary to provide a service to the user is increasing. The portable electronic device may use some components as an antenna radiator for the purpose of overcoming a limitation on space.

Aspects of the disclosure are to address at least the above-mentioned problems and/or disadvantages and to provide at least the advantages described below. An electronic device according to various embodiments of the disclosure may transmit/receive signals in a plurality of frequency bands by using a housing in which a slit is formed and a PCB as an antenna radiator.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a front plate and a back plate facing away from the front plate;
   a display positioned within the housing and exposed through the front plate; and
   a printed circuit board (PCB) interposed between the front plate and the back plate,
   wherein the back plate has a quadrangular shape including a first periphery elongated in a first direction, and a second periphery shorter than the first periphery and elongated in a second direction perpendicular to the first direction and includes:
      a first conductive part having a quadrangular cutting elongated from a corner in the second direction, when viewed from above the back plate,
      a second conductive part positioned in the cutting, when viewed from above the back plate, and
      an insulating part of an L shape elongated between the first conductive part and the second conductive part, when viewed from above the back plate, and contacting the first conductive part and the second conductive part,
   wherein the PCB includes:
      a first ground plane interposed between the first conductive part and the front plate, elongated in the second direction, and spaced apart from the second periphery,
      a second ground plane electrically connected with the first ground plane, and
      at least one radio frequency communication circuit electrically connected to a first point on the first ground plane adjacent to the first periphery and a second point on the first conductive part adjacent to the second periphery,
   wherein the second ground plane is elongated in the second direction parallel to the second conductive part between the second conductive part and the front plate, and
   wherein at least a portion of the second ground plane is elongated and is separated from an edge of the first ground plane by a slit elongated in the second direction along a portion of the insulating part.

2. The electronic device of claim 1, further comprising:
   a first flexible conductive member adjacent to at least one of the first periphery and the second periphery and positioned between the second ground plane and a third point on the second conductive part.

3. The electronic device of claim 1, further comprising:
   a second flexible conductive member positioned between the second ground plane and a fourth point of the second conductive part, which is positioned between the second point and the third point along the second periphery, when viewed from above the back plate.

4. An electronic device comprising:
   a housing including a front plate and a back plate facing away from the front plate;
   a display positioned within the housing and exposed through the front plate; and
   at least one printed circuit board (PCB) interposed between the front plate and the back plate,
   wherein the back plate has a quadrangular shape including a first periphery elongated in a first direction, and a second periphery shorter than the first periphery and elongated in a second direction perpendicular to the first direction and includes:
      a first conductive part having a quadrangular cutting elongated from a corner of the back plate in the second direction, when viewed from above the back plate,
      a second conductive part positioned in the cutting, when viewed from above the back plate, and
      an insulating part of an L shape elongated between the first conductive part and the second conductive part, when viewed from above the back plate, and contacting the first conductive part and the second conductive part,
   wherein the at least one PCB includes:
      a first ground plane interposed between the first conductive part and the front plate,
      a second ground plane electrically connected with the first ground plane, and
      at least one radio frequency communication circuit electrically connected to a first point on the first ground plane adjacent to the first periphery, a second point on the second conductive part adjacent to at least one of the first periphery and the second periphery, and a third point on the first conductive part adjacent to the second periphery,
   wherein the second ground plane is elongated in the second direction parallel to the second conductive part between the second conductive part and the front plate, and
   wherein at least a portion of the second ground plane is elongated and is separated from an edge of the first ground plane by a slit.

5. The electronic device of claim 4, wherein the slit formed in the second ground plane is elongated along a portion of the insulating part.

6. The electronic device of claim 4,
   wherein the second ground plane is electrically connected to a fourth point on the second conductive part, and wherein the fourth point is positioned between the second point and the third point along the second periphery, when viewed from above the back plate.

7. The electronic device of claim 6, further comprising:
a first flexible conductive member positioned between the second ground plane and a fourth point on the second conductive part.

8. The electronic device of claim 7, wherein the first flexible conductive member is a C-clip.

9. The electronic device of claim 6,
wherein the second ground plane is electrically connected to a fifth point on the second conductive part, and
wherein the fifth point is positioned between the second point and the fourth point along the second periphery, when viewed from above the back plate.

10. The electronic device of claim 9, further comprising:
a second flexible conductive member positioned between the second ground plane and the fifth point on the second conductive part.

11. The electronic device of claim 10, further comprising:
a switch configured to turn on or off an electrical connection through the second flexible conductive member,
wherein a processor included in the at least one PCB controls the on or off of the switch.

12. The electronic device of claim 10, further comprising:
a tuner installed in the second flexible conductive member,
wherein a processor included in the at least one PCB controls the tuner.

13. The electronic device of claim 4, further comprising:
a switch installed in a slit formed in the second ground plane to change a length of the slit,
wherein a processor included in the at least one PCB controls the switch.

14. An electronic device comprising:
a housing including a front plate and a back plate facing away from the front plate;
a display positioned within the housing and exposed through the front plate; and
at least one printed circuit board (PCB) interposed between the front plate and the back plate,
wherein the back plate has a quadrangular shape including a first periphery elongated in a first direction, and a second periphery shorter than the first periphery and elongated in a second direction perpendicular to the first direction and includes:
a first conductive part and a second conductive part separated by a first slit, and
an insulating part formed in the first slit and contacting the first conductive part and the second conductive part,
wherein the at least one PCB includes:
a first ground plane interposed between the first conductive part and the front plate,
a second ground plane electrically connected with the first ground plane, and
at least one radio frequency communication circuit electrically connected to a first point on the first ground plane adjacent to the first periphery, a second point on the second conductive part adjacent to at least one of the first periphery and the second periphery, and a third point on the first conductive part adjacent to the second periphery,
wherein the second ground plane is elongated in the second direction parallel to the second conductive part between the second conductive part and the front plate, and
wherein at least a portion of the second ground plane is elongated and is separated from an edge of the first ground plane by a second slit.

15. The electronic device of claim 14, wherein the first slit includes a first portion and a second portion elongated and formed in a direction different from the first portion.

16. The electronic device of claim 15,
wherein the first portion is parallel to the first direction, and
wherein the second portion is parallel to the second direction.

17. The electronic device of claim 15, wherein the first slit is of an L shape in which one end of the first portion is connected with one end of the second portion.

18. The electronic device of claim 15, wherein the first slit is of a T shape in which one end of the first portion is connected to a center of the second portion.

19. The electronic device of claim 15, wherein the first slit further includes a third portion elongated and formed in a direction parallel to the first portion.

20. The electronic device of claim 15, wherein the first slit further includes a third portion elongated and formed in a direction parallel to the second portion.

* * * * *